US006858455B2

(12) United States Patent
Guillom et al.

(10) Patent No.: US 6,858,455 B2
(45) Date of Patent: Feb. 22, 2005

(54) GATED FABRICATION OF NANOSTRUCTURE FIELD EMISSION CATHODE MATERIAL WITHIN A DEVICE

(75) Inventors: Michael A. Guillom, Knoxville, TN (US); Michael L. Simpson, Knoxville, TN (US); Vladimir I. Merkulov, Knoxville, TN (US); Anatoli V. Melechko, Knoxville, TN (US); Douglas H. Lowndes, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 10/155,841

(22) Filed: May 24, 2002

(65) Prior Publication Data

US 2002/0175323 A1 Nov. 28, 2002

Related U.S. Application Data

(60) Provisional application No. 60/293,780, filed on May 25, 2001.

(51) Int. Cl.⁷ .............................................. H01L 21/00
(52) U.S. Cl. ............................. 438/20; 445/24; 445/50
(58) Field of Search .............................. 438/20; 445/24, 445/50

(56) References Cited

U.S. PATENT DOCUMENTS

| | | | | |
|---|---|---|---|---|
| 5,986,388 A | * | 11/1999 | Makishima | 313/309 |
| 6,440,763 B1 | * | 8/2002 | Hsu | 438/20 |
| 6,472,802 B1 | * | 10/2002 | Choi et al. | 313/309 |
| 6,692,324 B2 | * | 2/2004 | Simpson et al. | 445/24 |

OTHER PUBLICATIONS

Ren et al., "Growth of a single freestanding multiwall carbon nanotube on each nanonickel dot", Applied Physics Letters, vol. 75, No. 8, Aug. 23, 1999, pp. 1086–1088.*

Merkulov et al., "Patterned growth of individual and multiple vertically aligned carbon nanofibers", Applied Physics Letters, vol. 76, No. 24, Jun. 12, 2000, pp. 3555–3557.*

Guillorn, et al., "Operation of a gated field emitter using an individual carbon nanofiber cathode," Applied Physics Letters, vol. 79, No. 21, pp. 3506–3508, Nov. 19, 2001.

Baylor, et al., "Field emission from isolated individual vertically aligned carbon nanocones" Journal of Applied Physics, vol. 91, No. 7, pp. 4602–4606, Apr. 1, 2002.

Yahachi et al., "Field Emission Patterns from Single–Walled Carbon Nanotubes," Japan Journal Applied Physics, vol. 36, pp. 1340–1342, Oct. 1, 1997.

Matsumoto, et al., "Ultralow biased field emitter using single–wall carbon nanotube directly grown onto silicon tip by thermal chemical vapor deposition," Applied Physics Letters, vol. 78, No. 4, pp. 539–540, Jan. 22, 2001.

(List continued on next page.)

Primary Examiner—Richard A. Booth
(74) Attorney, Agent, or Firm—John Bruckner, P.C.

(57) ABSTRACT

Gated field emission devices and systems and methods for their fabrication are described. A method includes growing a substantially vertically aligned carbon nanostructure, the substantially vertically aligned carbon nanostructure coupled to a substrate; covering at least a portion of the substantially vertically aligned carbon nanostructure with a dielectric; forming a gate, the gate coupled to the dielectric; and releasing the substantially vertically aligned carbon nanostructure by forming an aperture in the gate and removing a portion of the dielectric.

9 Claims, 17 Drawing Sheets

OTHER PUBLICATIONS

Guillorn, et al., "Fabrication of gated cathode structures using an in situ grown vertically aligned carbon nanofiber as a field emission element ", Journal of Vacuum Science, pp. 573–578, Mar./Apr. 2001.

Rinzler, et al., "Unraveling Nanotubes: Field Emission from an Atomic Wire" available at wwww.jstor.org, pp. 1550–1553, May 9, 2002.

Merkulov, et al., "Patterned growth of individual and multiple vertically aligned carbon nanofibers," Applied Physics Letters, vol. 76, No. 24, pp. 3555–3557, Jun. 12, 2000.

Xueping, et al., "A method for fabricating large–area, patterned, carbon nanotube field emitters," Applied Physics Letters, vol. 74, No. 17, pp. 2549–2551, Apr. 26, 1999.

Merkulov, et al., "Scanned–probe field–emission studies of vertically aligned carbon nanofibers" Journal of Applied Physics, vol. 89, No. 3, pp. 1933–1937, Feb. 1, 2001.

Bonard, et all, "Field emission from single–wall carbon nanotube films" Applied Physics Letters, vol. 73, No. 7, pp. 918–920, Aug. 17, 1998.

Xueping, et al., "Carbon Nanotube–based vacuum microelectronic gated cathode,"Material Research Society Symposium, vol. 509, pp. 107–109, 1998.

Dean, et al., "The environmental stability of field emission from single–walled carbon nanotubes" Applied Physics Letters, vol. 75, No. 19, pp. 3017–3019, Nov. 8, 1999.

Wang, et al., "Flat panel display prototype using gated carbon nanotube field emitters," Applied Physics Letters, vol. 78, No. 9, pp. 1294–1296, Feb. 26, 2001.

Lee, et al., "Realization of Gated Field Emitters for Electrophotonic Applications Using Carbon Nanotube Line Emitters Directly Grown into Submicrometer Holes," Advanced Materials Communications, vol. 13, No. 7, pp. 479–482, Apr. 4, 2001.

Guillorn, et al. "Microfabricated field emission devices using carbon nanofibers as cathode elements", Journal of Vaccuum Science Technology B19(6), pp. 2598–2601, Nov./Dec. 2001.

* cited by examiner

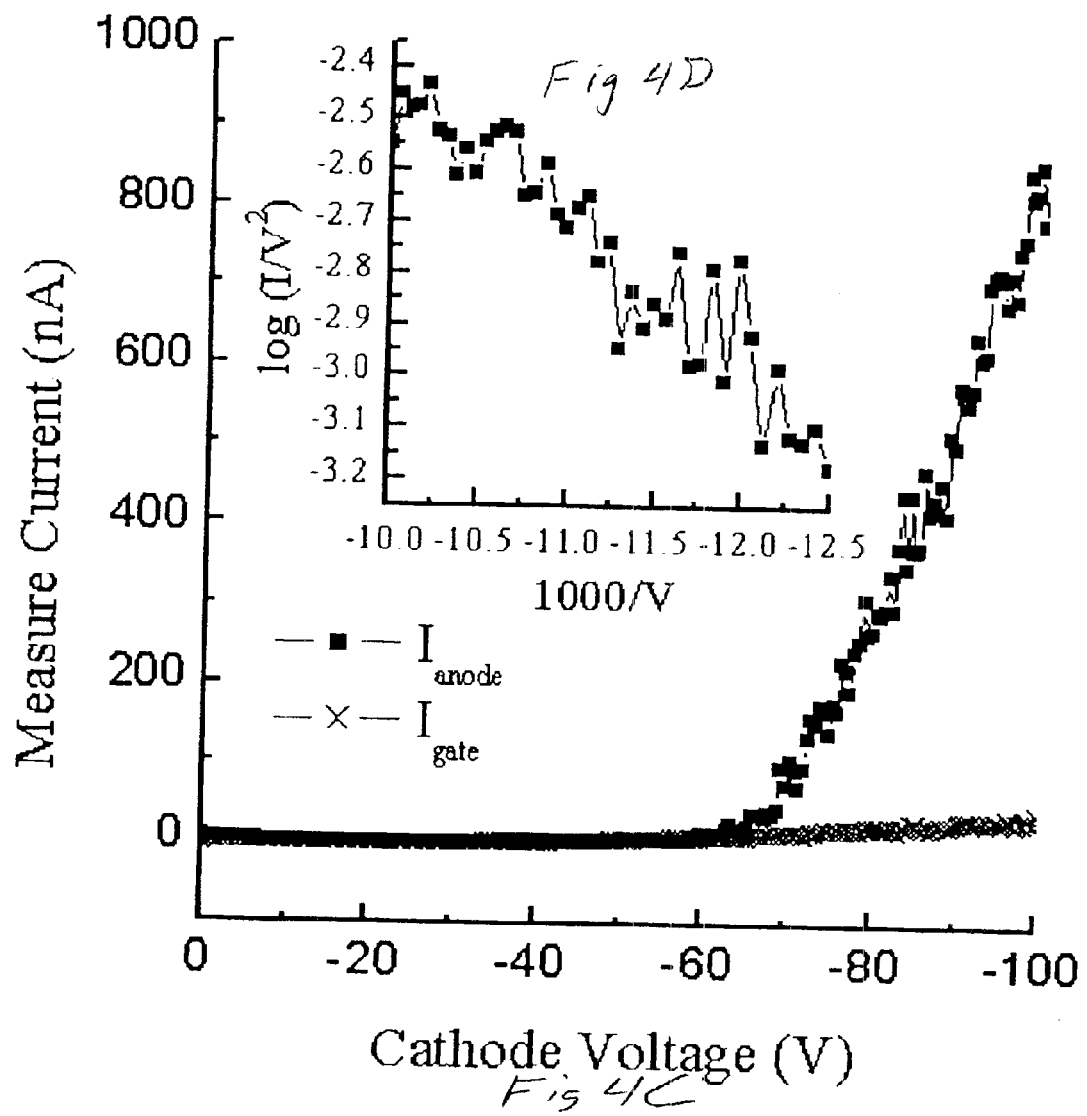

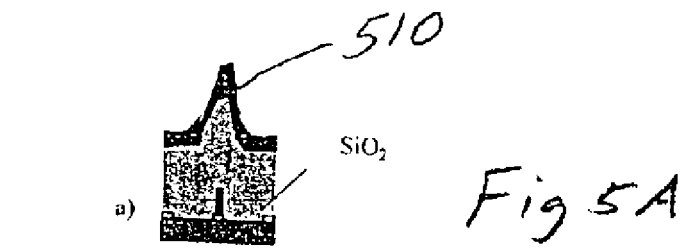
Fig 5A
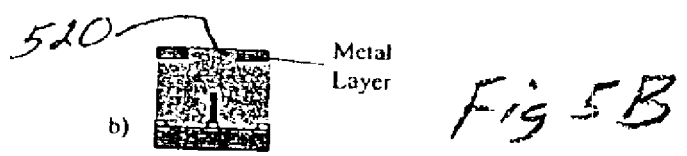
Fig 5B
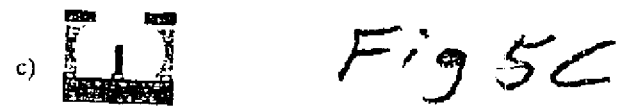
Fig 5C
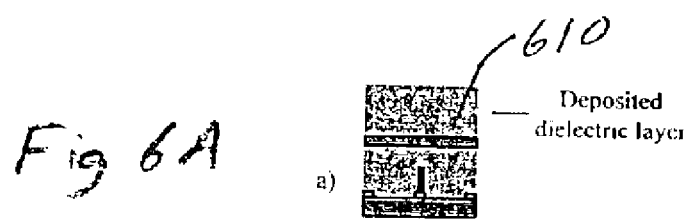
Fig 6A
Fig 6B
Fig 6C
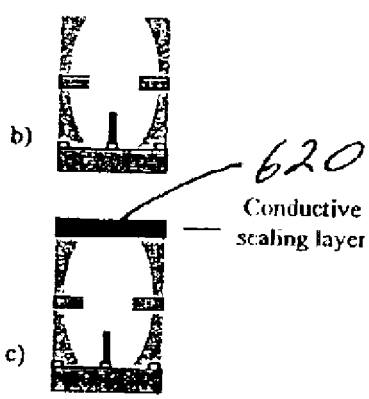
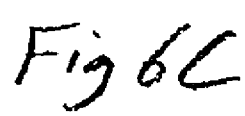

FIG 16A
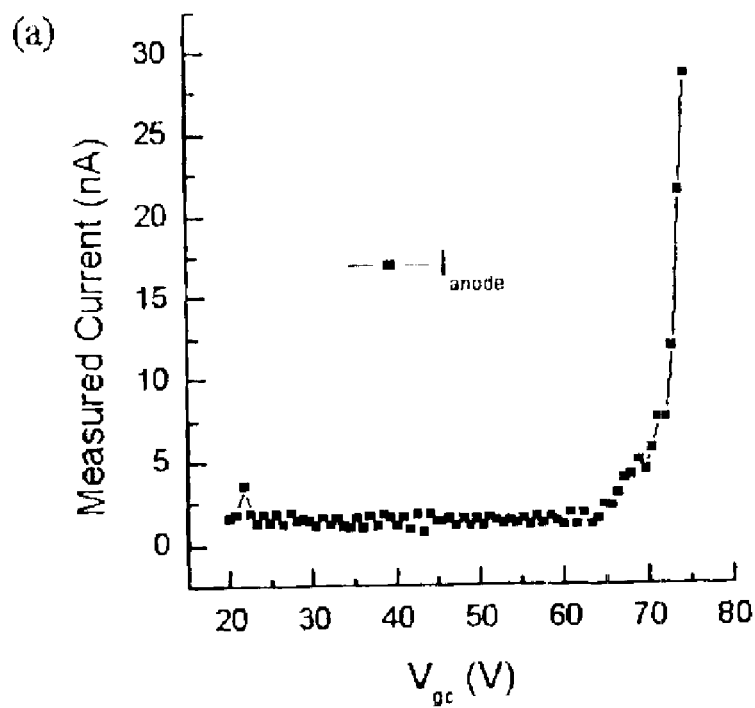
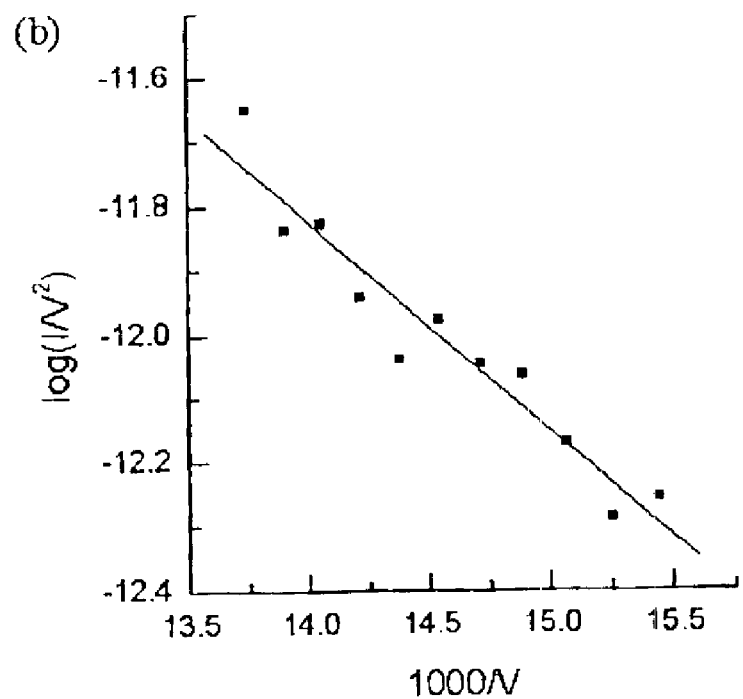
Fig 16B

GATED FABRICATION OF NANOSTRUCTURE FIELD EMISSION CATHODE MATERIAL WITHIN A DEVICE

CROSS-REFERENCE TO RELATED APPLICATION

This application is related to and claims a benefit of priority under 35 U.S.C. 119(e) from U.S. Ser. No. 60/293,780, filed May 25, 2001, (ID No. 0960, S-96,723), the entire contents of which are hereby expressly incorporated by reference for all purposes.

STATEMENT AS TO RIGHTS TO INVENTIONS MADE UNDER FEDERALLY-SPONSORED RESEARCH OR DEVELOPMENT

This invention was made with United States Government support under contract No. 1868HH26X1 to UT-Battelle, L.L.C. awarded by DARPA. The Government has certain rights in this invention.

BACKGROUND OF THE INVENTION

1. Field of the Invention

The invention relates generally to the field of electron emitting devices. More particularly, the invention relates to gated field emission devices.

2. Discussion of the Related Art

Field emission (FE) of electrons from nanostructured graphitic carbon-based materials including single-[1-3] and multi-walled[4,5] carbon nanotubes (CNT) and carbon nanofibers[6,7] (CNF) has been an area of intense investigation in recent years. This body of research indicates that these materials have several advantages over other candidate materials for FE applications, namely very low turn-on fields, $E_{to}$, for initiation of electron emission and extraordinary environmental stability[8]. Most of the work in this field has focused on measurements of the FE properties of these materials deposited or grown onto a variety of flat substrates using a vast array of different deposition and measurement techniques. However, very little work has been presented on integrated gated cathode structures using these materials as FE elements. Xu and Brandes[9] presented the first operating CNT-based gated cathode device in 1998 employing disordered mats of multi-walled CNTs (MWNT) grown within electrostatic gating structures by thermal chemical vapor deposition (CVD) Wang et al[10] reported the operation of a similar device fabricated by a novel technique using a paste of CNT material and conductive epoxy deposited into microfabricated well structures. Lee et al[11] also have recently reported on the operation of gated cathode structures similar to those demonstrated by Xu and Brandes with minor improvements in the structure fabrication process and increased control of the in situ MWNT growth step.

The disordered mat CNT material in the gated cathode structures referenced above is likely to contain numerous FE sites; there are multiple CNT tips in each cathode and there is evidence that that FE can occur from sites located along the walls[11]. While all of these devices possess operating characteristics desirable in any FE device (i.e., low $E_{to}$ and high brightness) these fabrication processes offer no way to precisely control the factors of location, orientation, shape or density of the emission sites. These factors complicate the construction of FE devices that produce a well-focused electron beam as required in applications such as electron microscopy or electron beam lithography.

Recently, we reported[12] a technique for fabricating gated cathode structures that uses a single in situ grown vertically aligned CNF (VACNF) as an FE element. This technique is disclosed and claimed in copending U.S. Ser. No. 09/810,531, filed Mar. 15, 2001 (ID No. 0842, S-92,869). This technique offers a way to produce gated cathode structures that takes full advantage of the FE properties inherent to nanostructured graphitic carbon materials, while providing a deterministic way to control the point of emission. A technique for producing these devices using conventional wafer-scale microfabrication techniques would greatly enhance this technology.

Another problem with this technology has been the need to use lithography equipment with sophisticated alignment capabilities. Equipment with these capabilities is expensive. The use of this equipment also requires time for the alignment function to be completed, thereby further adding to the overall cost of fabrication. What is also needed, therefore, is an approach that obviates the need for lithography equipment with sophisticated alignment capabilities.

Heretofore, the requirements of precisely controlling the location, orientation, shape and/or density of gated nanostructure field emission cathode material within a device structure without lithography equipment having sophisticated alignment capabilities when fabricating a gated emission site have not been met. What is needed is a solution that addresses (preferably all of) these requirements.

SUMMARY OF THE INVENTION

There is a need for the following aspects of the invention. Of course, the invention is not limited to these aspects.

According to an aspect of the invention, a process is composed by a method comprising: growing a substantially vertically aligned carbon nanostructure, the substantially vertically aligned carbon nanostructure coupled to a substrate; covering at least a portion of the substantially vertically aligned carbon nanostructure with a dielectric; forming a gate, the gate coupled to the dielectric; and releasing the substantially vertically aligned carbon nanostructure by forming an aperture in the gate and removing a portion of the dielectric. According to another aspect of the invention, a manufacture is composed by an apparatus comprising: a substantially vertically aligned carbon nanostructure coupled to a substrate; a dielectric coupled to the substrate and surrounding at least a portion of the substantially vertically aligned carbon nanostructure; a gate coupled to the dielectric, the gate including a aperture substantially aligned with the substantially vertically aligned carbon nanostructure; another dielectric coupled to the gate, the another dielectric including a conduit substantially aligned with the substantially vertically aligned carbon nanostructure; and a focusing electrode coupled to the another dielectric, the focusing electrode including another aperture substantially aligned with the substantially vertically aligned carbon nanostructure, wherein the dielectric, the gate, the another dielectric and the another aperture define a well that circumscribes the substantially vertically aligned carbon nanostructure.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings. The invention may be better understood by reference to one or more of these drawings in combination with the description presented herein. It should be noted that the features illustrated in the drawings are not necessarily drawn to scale.

FIG. 4C illustrates current as a function of cathode voltage for a device following constant voltage bias operation, representing an embodiment of the invention.

FIG. 4D illustrates the measured anode current of FIG. 4C plotted in Fowler-Nordheim coordinates, representing an embodiment of the invention.

FIGS. 5A–5C illustrate schematic views of a self alignment process, representing an embodiment of the invention.

FIGS. 6A–6C illustrate schematic views of a process for forming fully sealed integrated vacuum triodes, representing an embodiment of the invention.

FIGS. 16A and 16B illustrate (a) $I_a$ measured during an FE I-V curve of a single device where $V_f$=50 V and (b) a corresponding Fowler Nordheim plot of the data shown in (a), representing an embodiment of the invention.

DESCRIPTION OF PREFERRED EMBODIMENTS

Figure 1:
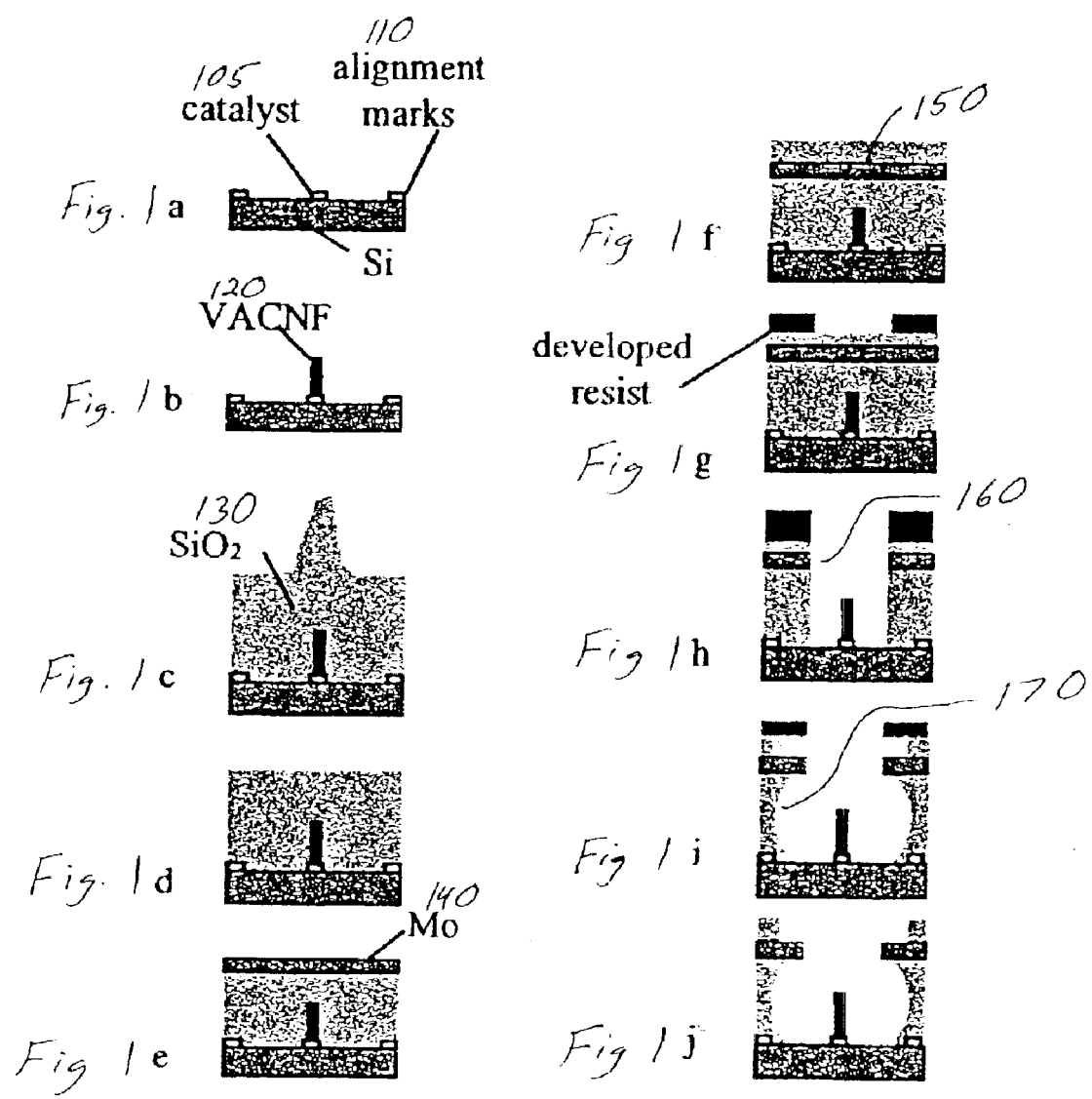
FIGS. 1A–1J illustrate schematic views of a process, representing an embodiment of the invention.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced by superscript Arabic numerals. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. Patents, and U.S. patent applications in which the issue fees have been paid, disclose embodiments that are satisfactory for the purposes for which they are intended. The entire contents of U.S. Pat. Nos. 6,359,383; 6,339,281; 6,333,968; 6,250,984; 6,097,138; and 5,229,331 are all hereby expressly incorporated by reference herein for all purposes. The entire contents of U.S. Ser. No. 10/068,795, filed Feb. 6, 2002; U.S. Ser. No. 09/964,270, filed Sep. 26, 2001; U.S. Ser. No. 09/810,531, filed Mar. 15, 2001; U.S. Ser. No. 09/795,660, filed Feb. 27, 2001; and U.S. Ser. No. 09/449,844, filed Nov. 26, 1999 are all hereby expressly incorporated by reference herein for all purposes.

In general, the context of the invention can comprise processes that include the fabrication of a gated field emission device using a single nanostructure as the field emission element. The context of the invention can also comprise electronic components that include a gated field emission device having a single nanostructure as the field emission element. The single nanostructure can be a nanofiber or nanotube (single-wall or multi-wall) composed of one or more elements. More specifically, the context of the invention can include processes that include the fabrication of an integrated, cold cathode, field emitter device using a single vertically aligned carbon nanofiber as the field emission element. Similarly, the context of the invention can also include electronic components that include an integrated, cold cathode, field emission device having a single nanostructure (e.g., vertically aligned carbon nanofiber) as the field emission element.

The gate aperture can be made to be any size or shape achievable using any lithography technique. In general, smaller aperture sizes are better, but this is largely dependent on the application. For example, the apertures can nominally have a diameter of less than approximately four microns, preferably less than approximately two microns, more preferably less than approximately one micron, and most preferably less than approximately 500 nanometers. Suitable lithographic techniques for forming the apertures include direct write electron beam lithography, x-ray lithography, focused ion beam lithography, projection electron beam lithography, and/or projection ion beam lithography. While the depicted apertures show circular shapes, the apertures may be oval, elliptical, parabolic, triangular, square, pentagonal, hexagonal, etc., in shape.

The invention can be performed using any dielectric material between the gate and cathode that can be deposited onto the VACNF or vertically aligned nanostructured emitter without destroying it. The dielectric material can include silicon dioxide, silicon nitride, polyimide, and/or parelene. Suitable deposition techniques for a silicon dioxide dielectric include spin-on glass, PECVD, LPCVD, RF sputtering, and/or electron beam evaporation. Suitable deposition techniques for silicon nitride dielectrics include PECVD, LPCVD, RF sputtering, and/or electron beam evaporation. Suitable deposition techniques for polyimide and parylene dielectric materials include spin casting and/or vapor deposition. Suitable etching techniques for silicon dioxide and silicon nitride dielectric materials include ion milling, reactive ion etching, wet chemical etching, focused ion beam milling, and/or focused electron beam stimulated etching. Suitable etching techniques for polyimide and parylene dielectric materials include ion milling, reactive ion etching, focused ion beam milling, and/or focused electron beam stimulated etching.

The invention can be performed using any metal, combination of metals, or n-type semiconductor for the gate electrode so long as it can be patterned by using processing techniques such as plasma etching, reactive ion etching, ion milling, wet chemical etching or liftoff. Suitable materials for use as the gate electrode include tungsten, N+ polysilicon, germanium, and/or chrome.

The thickness of the dielectric layer between the gate and the oxide can be varied to any thickness beyond the height of the VACNF emitter that can be achieved using any deposition technique that does not destroy the VACNF. The thickness of the dielectric layer is preferably approximately one micron. However, the thickness of the dielectric layer should be a function of the height of the fiber and the driving voltage of the device. Higher voltage operation requires a thicker dielectric layer. A taller fiber also requires a higher dielectric layer thickness, in general.

The etching used to pattern the $SiO_2$ layer between the gate and cathode can be performed using reactive ion etching, wet chemical etching, ion milling or plasma etching.

The invention is capable of deterministically producing a nanostructured graphitic carbon-based field emission tip inside a functional electrostatic gating structure, such as the VACNF in the present embodiment. It is capable of controlling the location and geometry of that tip deterministically.

The invention does not require the definition of an electrostatic potential on any aspect of the structure during the fabrication process.

The invention can be scaled to produce these devices on any substrate amenable to microfabrication techniques (e.g., quartz, fused silica, oxidized Si wafers). These substrates can be of any wafer size including 2:, 3: (75 mm), 100 mm, 150 mm, 200 mm, and 300 mm.

The invention can be used to produce devices with cathode elements, such as the VACNF in the present embodiment, that are grown or deposited at any temperature compatible with the substrate.

The invention can be used to fabricate a variety of more complicated structures that have multiple layers of electrostatic lenses or accelerator electrodes in a dielectric well of arbitrary aspect ratio and geometry. In one embodiment, this can be achieved by iterating the process steps corresponding to FIGS. 1C through 1E. The devices can then be completed using the process steps corresponding to FIGS. 1F through 1J. An embodiment of such a device is described by FIGS. 12, 13, 14, 15, 16 and 19.

The gate layer can be patterned by any thin film etching technique such as plasma etching, reactive ion etching, ion milling, wet chemical etching, electron beam stimulated etching or liftoff.

The invention can include fabrication and operation of integrated gated field emission devices using single vertically aligned carbon nanofiber (VACNF) cathodes where the gate aperture has been formed using a self-aligned technique based on chemical mechanical polishing. We find that this method for producing gated cathode devices easily achieves structures with gate apertures on the order of 2 μm that show good concentric alignment to the VACNF emitter. The operation of these devices was explored and field emission characteristics that fit well to the Fowler-Nordheim model of emission was demonstrated.

The gate aperture can be made to be self-aligned with the VACNF cathode. FIGS. 5A–5C depict a process flow for fabrication of the gated cathode structures with a self-aligned gate aperture. One embodiment of this would involve coating the substrates with a conformal layer 510 of any metal that can be removed by the processes described above and by CMP (see FIG. 5A). This metal layer should be of sufficient thickness that when CMP is performed, the apertures 520 are formed as the protrusions covering the fibers are removed (see FIG. 5B). To complete these structures any form of etching that will not destroy the VACNF buried in the dielectric material can be sued (see FIG. 5C).

While some misalignment may be present between the position of the VACNF and the center of the gate aperture, this figure is typically less than 100 nm; the morphology of the VACNF and its geometric relation to the substrate play a large role in determining the severity of this misalignment. The principle advantage of this technique is that it does not require sophisticated lithography tools with very accurate alignment systems to make these devices. Readily commercially available tool sets can be used to achieve alignments errors far less than 50 nm consistently across an entire substrate; this level of precision in the alignment may be an advantage for certain applications of this electron emission technology.

The invention can be used to make fully sealed microscale vacuum devices (e.g., triodes, pentodes). FIGS. 6A–6B depict a process flow for fabrication of a fully sealed micro/nano fabricated vacuum triode. In one embodiment, after following the process steps corresponding to FIGS. 1A through 1E, a dielectric layer 610 of arbitrary thickness can be deposited onto the substrates (see FIG. 6A) and patterned (see FIG. 6B) as described in the process steps corresponding to FIGS. 1G through 1J. A conductive sealing layer 620 can be deposited or bonded onto the structures under vacuum to create a sealed cavity with a conducting cover (FIG. 6C). This sealing layer can then be patterned using conventional lithographic techniques to achieve a working electronic device.

The invention can include the fabrication and operation of vertically aligned carbon nanofiber-based field emission devices with an integrated focusing electrode. The presence of this electrode was found to have a profound impact on dc device performance. The gate to cathode bias required to extract 20 nA of current from the VACNF cathode was found to decrease linearly with increasing levels of bias applied to the focusing electrode while the majority of the emitted current was collected by a macroscopic Cu anode, implying that the beam is reasonably well-focused. Aspects of the device fabrication process and device operation are discussed in more detail below.

The focusing electrode has a strong effect on the dc operating characteristics of these devices. In particular, it modulates the extraction voltage required to source a given value of current through the VACNF emitter. This is presumably caused by the change in the electric field induced by the focus electrode on the emitter tip. While the focusing properties of this device were not explored in this work the geometry of the device and the small level of emission current collected at the gate and focus electrodes implies that the emitted beam is reasonably focused even without optimizing the operating conditions. Imaging of the emitted beam using a micro channel plate-based system and modeling of this device are currently being investigated.

It is desirable to produce FE nanostructures with higher aspect ratio tips. Higher aspect ratio tips will facilitate lower device operating voltages.

The invention can be used to fabricate gated cathode structures using a variety of other nanostructured carbon-based materials that can be deposited onto wafer sized substrates compatible with standard microfabrication techniques. These materials may include single- and multi-walled carbon nanotube mats, diamond like carbon and hot filament CVD carbon films, single or multiple unaligned carbon nanofibers, single or multiple carbon nanocones or multiple VACNFs. These materials can be of any height or aspect ratio such that they can be completely covered by a dielectric material.

The terms release and releasing, as used herein in relation to the emissive nanostructure are defined as exposing or uncovering at least a portion of, preferably most of, and/or all of the emissive nanostructure so that it can function as an emissive device. The terms a and an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

EXAMPLES

Specific embodiments of the invention will now be further described by the following, nonlimiting examples which will serve to illustrate in some detail various features. The following examples are included to facilitate an understanding of ways in which the invention may be practiced. It should be appreciated that the examples which follow represent embodiments discovered to function well in the practice of the invention, and thus can be considered to constitute preferred modes for the practice of the invention. However, it should be appreciated that many changes can be made in the exemplary embodiments which are disclosed while still obtaining like or similar result without departing from the spirit and scope of the invention. Accordingly, the examples should not be construed as limiting the scope of the invention.

Example 1

FIGS. 1A–1J depict a process flow for fabrication of the gated cathode structures. Three-inch diameter low resistivity n-type Si wafers were used as substrates throughout this example. Prior to performing processing, the substrates were cleaned in a solution of ammonium fluoride and hydrofluoric (HF) acid 6:1 for 60 s to remove native oxide from the substrate surface. Immediately following this cleaning, the substrates were spin coated with a bilayer of polymethyl methacrylate (PMMA, MicroChem, Nano PMMA). The bilayer consisted of two different molecular weight PMMA formulations to produce an undercut in the developed resist sidewall profile to facilitate liftoff pattern transfer. The lower layer was a 4% 495K PMMA in anisole spun onto each substrate at 4000 rpm for one minute to produce a 1000 Å thick layer. Following spin coating, each substrate was baked for 15 minutes on a 170° C. hotplate. After removing the substrates from the hotplate, a layer of 2% 950 k PMMA in methyl isobutyl ketone (MIBK) was spun onto each substrates at 2000 rpm for one minute to provide an additional 800 Å thick layer. This coating step was followed by a final bake identical to the one used for the first layer.

High-resolution direct write electron beam lithography (EBL) was used to define the first layer of features consisting of the VACNF catalyst sites 105, global and die-level registration marks (aka alignment marks 110) for subsequent photolithography steps. A Leica VB6-HR with a 100 keV thermal field emission source was used to perform the electron beam lithography exposures. A beam current of 1 nA and a pixel size of 5 nm were used to pattern all of the features on this layer. An electron area dose of 1000 $\mu C/cm^2$ was used to expose the VACNF catalyst sites The sites were patterned as 40 nm octagons on a 50 $\mu$m pitch in a 3×3 array and were intentionally overexposed to produce 50-nm circular dots. All other features on this layer were exposed with a does of 800 $\mu C/cm_2$. A 5×5 array of die was patterned onto each substrate with 10 mm spacing between die in both the X and Y directions.

The electron beam exposures were developed in a solution of MIBK:isopropanol 1:3 for one minute with no agitation. Prior to metallization, each substrate was subjected to a RIE step (Plasma-Term, PT72) in an $O_2$ plasma for six seconds to remove undeveloped resist from the patterned areas. A plasma power of 0.25 $W/cm^2$ with a chamber pressure of 30 mtorr and an $O_2$ flow of 30 sccm was used during this etch.

Using an electron gun PVD system, the substrates were metallized with 200 Å of Ti and 200 Å of NiFe alloy (1:1). An evaporation rate of 6 Å/s and a base chamber pressure of $10^{-6}$ torr were used for both depositions. Following removal from the PVD system the substrates were allowed to soak in a solution of acetone and methylene chloride 1:1 for two hours, thereby dissolving the unexposed resist and lifting off the metal from the unexposed areas. Then, 30 s of ultrasonic agitation was applied to the substrates at the end of this process while still in solution. The substrates were removed from the solution and rinsed thoroughly to ensure that all metallic debris was washed away.

Referring to FIG. 1B, DC plasma enhanced chemical vapor deposition (PECVD) growth of VACNFs 120 was performed in a glass vacuum chamber evacuated by a mechanical pump to a base pressure of less than 5 mtorr. Prior to VACNF growth, the substrates were etched in an ammonia plasma and then annealed at 700–750° C.; the temperature at which VACNFs are typically grown. Previous work[14] has shown that an initially continuous Ni thin film, nominally 20 nm thick, breaks into submicron droplets during this annealing phase. For circularly patterned catalyst sites, the diameter of the patterned area and the thickness of the Ni determine whether multiple or single droplets form during the annealing. By restricting the diameter, a single Ni droplet forms[14]. This droplet is the necessary precursor for the catalytic growth of single VACNFs at the lithographically predetermined locations.

Still referring to FIG. 1B, a mixture of carbonaceous and etchant source gases was used for the VACNF growth. Acetylene and ammonia can be used. The etchant is needed to remove the graphitic C film that continuously forms during the growth from the plasma discharge, passivating the catalyst and thereby preventing the formation of VACNFs. To initiate the VACNF growth process the ammonia-helium mixture is introduced into the chamber first and a DC plasma discharge is created. After the plasma is started, acetylene is introduced and the VACNF growth begins. Each Ni droplet initiates the formation of an individual VACNF and the Ni droplets ride upward on the tips of the VACNFs, providing continued catalytic growth. The VACNFs are aligned along the direction of the electric field in the plasma discharge and normally grow perpendicular to the substrate. The VACNFs produced for this example were conical in shape possessing, on average, a base diameter of 200 nm, a height of 1 $\mu$m and a tip radius of curvature of 20 nm.

Referring to FIG. 1C, a 2.5-$\mu$m thick conformal layer 130 of $SiO_2$ was then deposited onto the substrates by a silane-based RF PECVD process operated at a chamber temperature of 275° C. In order to perform further processing on these substrates chemical mechanical polishing (CMP) was used to planarize the structures (see FIG. 1D). The $SiO_2$ layer was polished until all gross surface nonuniformities had been removed, producing a final oxide thickness of approximately 1.5 $\mu$m.

Referring to FIG. 1E, a Mo gate electrode layer 140 was deposited. Photoresist was then applied to the substrates and the gate electrode pattern was exposed. This pattern consisted of a 3×3 array of 10-$\mu$m square electrodes individually contacted by macroscopic probing pads and aligned to the 3×3 array of VACNF emitters buried beneath the $SiO_2$ layer.

Following the exposures, the substrates were developed in a standard photoresist developer. A 10-nm thick layer of Ti followed by a 40-nm thick layer of Mo was deposited onto the substrates using electron gun PVD (see FIG. 1F) to provide a bonding pad layer. Pattern transfer in this step was performed by liftoff.

A 200-nm thick film of $SiO_2$ 150 was deposited onto the substrates using the same PECVD process described above. This layer eliminates charging of the electrode structures during subsequent etching steps. Omission of this step was found to have a significant impact on the structure yield. Photoresist 160 was applied to the substrates and a pattern of squares aligned to the Mo/Ti bonding pads was exposed. Using the resist as an etch mask, the oxide over the bonding pads was subjected to a RIE step using a $CHF_3/O_2$ (50 sccm:2 sccm) plasma at a chamber pressure of 60 mtorr and a plasma power density of 0.3 W/cm$^2$. This step was performed to permit electrical contact of the probing pads to be made during device testing.

A final photolithography step was performed to define an aperture 160 in the extracting electrode and release the buried VACNF emitters. Resist was applied to the substrates and an auto-aligning I-line stepper (GCA AS200) was used to perform the exposures. This tool is capable of achieving overlay of less than 50 nm with respect to preexisting EBL defined features, as demonstrated in our previous work[12]. The exposed pattern in this example included of 2 μm apertures aligned concentrically with the buried VACNF emitter. Using the resist as an etch mask, the substrates were subjected to a $CHF_3/O_2$ RIE to pattern the $SiO_2$ protection layer, a brief $CF_4/O_2$ RIE step to pattern the Mo/Ti gate layer followed by a final $CHF_3/O_2$ $SiO_2$ etch (see FIG. 1H) to release the buried VACNF. These etching processes were conducted using the same operating parameters described above. RIE of these layers was performed to maintain dimensional control of the patterned features. However, it should be noted that any etch process that achieves similar results can be used. The RIE process has been found to inflict minimal structural damage on the buried VACNF structures while improving their FE properties. [7]The structures were dipped into a dilute HF solution (10:1, deionized water:HF) for one minute to create undercut 170 in the well sidewall profile (see FIG. 1I). This was done to help prevent charging of the well sidewalls during device operation. Finally, the photoresist was removed in acetone (see FIG. 1J), completing the structure.

Figure 2:
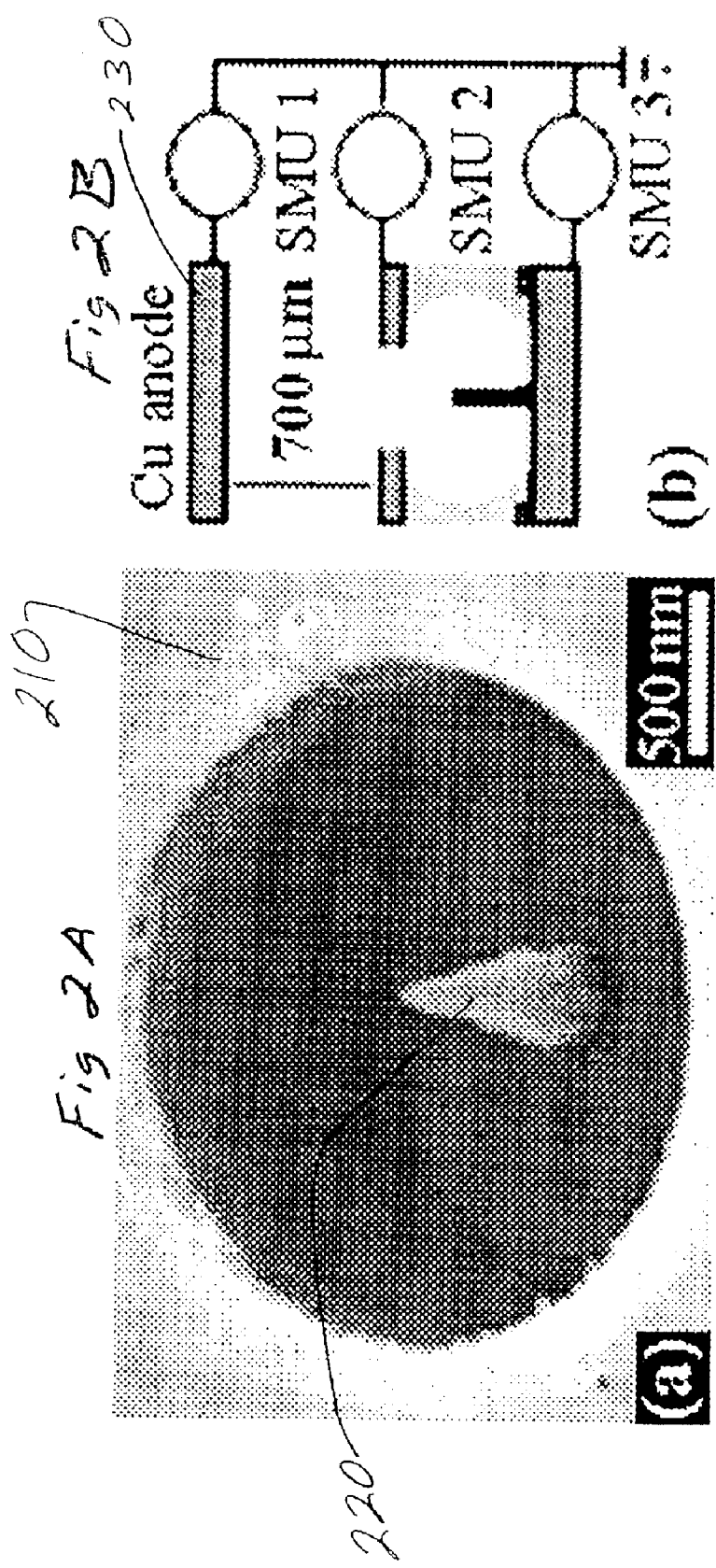
FIGS. 2A–2B illustrates views of a device and a schematic representation of the measurement system used to verify the operating characteristics of the embodiment, representing an embodiment of the invention.

FIG. 2A shows an actual micrograph of a finished device 210 taken at a 35° angle from normal incidence. It can be appreciated that the emitting structure 220 is very well located, orientated and shaped.

FIG. 2B shows a schematic of an FE measurement setup. Field emission measurements were carried out in a chamber evacuated to a pressure of $10^{-6}$ torr producing a test environment similar to potential, less than ideal, operating environmental. A Cu anode 230 was placed 700 μm directly above the Si substrate containing the VACNF-based FE device 210. A Hewlett Packard 4156A Precision Semiconductor Parameter Analyzer containing four DC source measure units (SMU) was connected to the structure and anode as shown in FIG. 2B. All of the data presented in this example was obtained with the gate at ground potential, and a 100-V positive bias on the anode. Anode and gate currents were measured as the cathode potential was varied between ground and –100 V.

Figure 3:
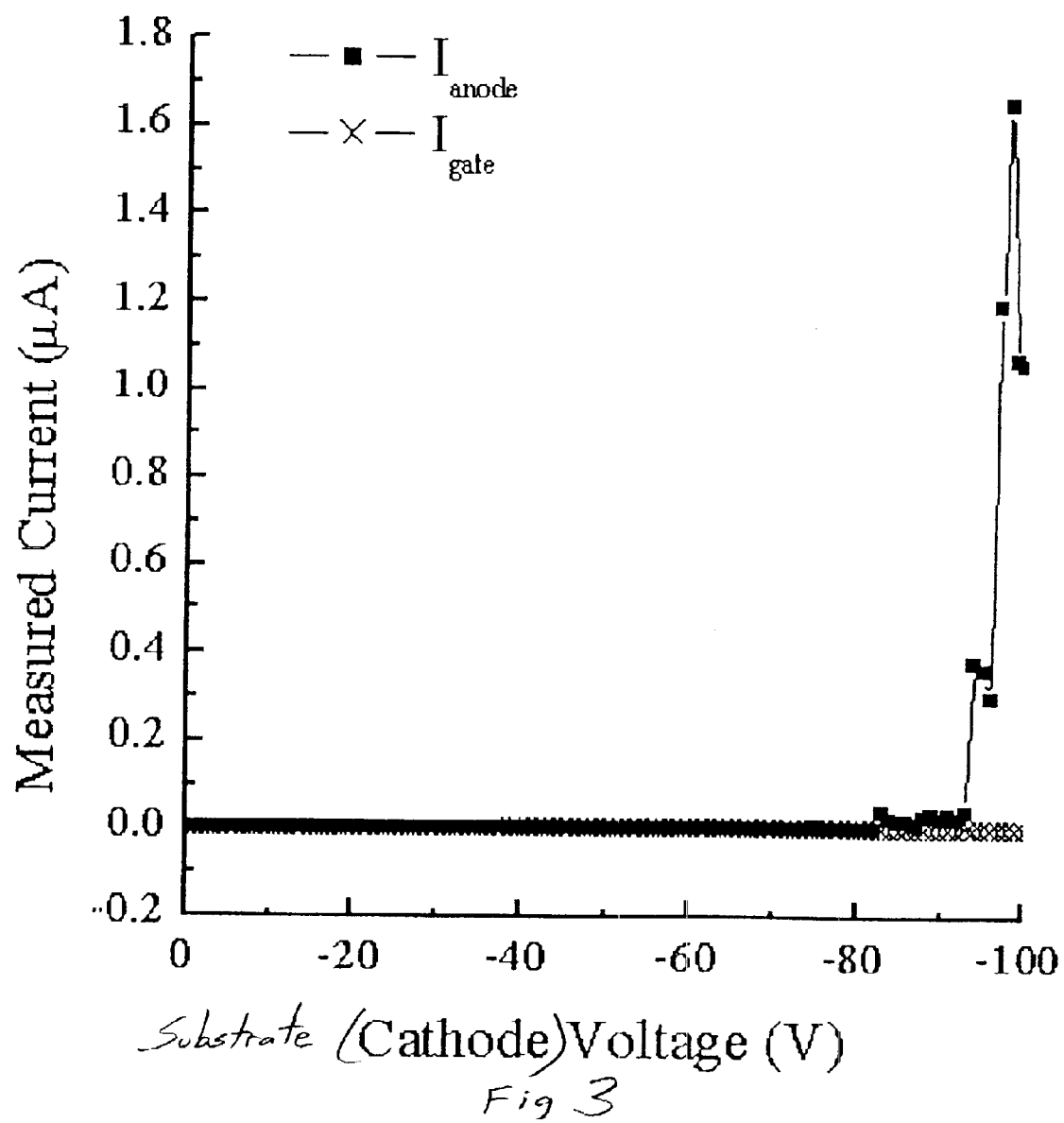
FIG. 3 illustrates current as a function of substrate voltage for a device during initial operation, representing an embodiment of the invention.

FIG. 3 depicts initial FE I-V curves for a 2-um aperture structure showing the measured anode and gate current, displaying an $E_{to}$ of 75 V/μm. $E_{to}$ is defined herein as the macroscopic electric field required to extract 10 nA of FE current. While not being bound by theory, the apparent lack of a monotonic increase in anode current with increasing gate-cathode bias after FE has been initiated can possibly be attributed to the vacuum level of the test chamber and the initial condition of the tip. The structure was not cleaned prior to operation, ensuring that gas was adsorbed onto the VACNF. Constant bias measurements of the emission current were then conducted using a cathode bias of –90 V.

Figures 4A, 4B:
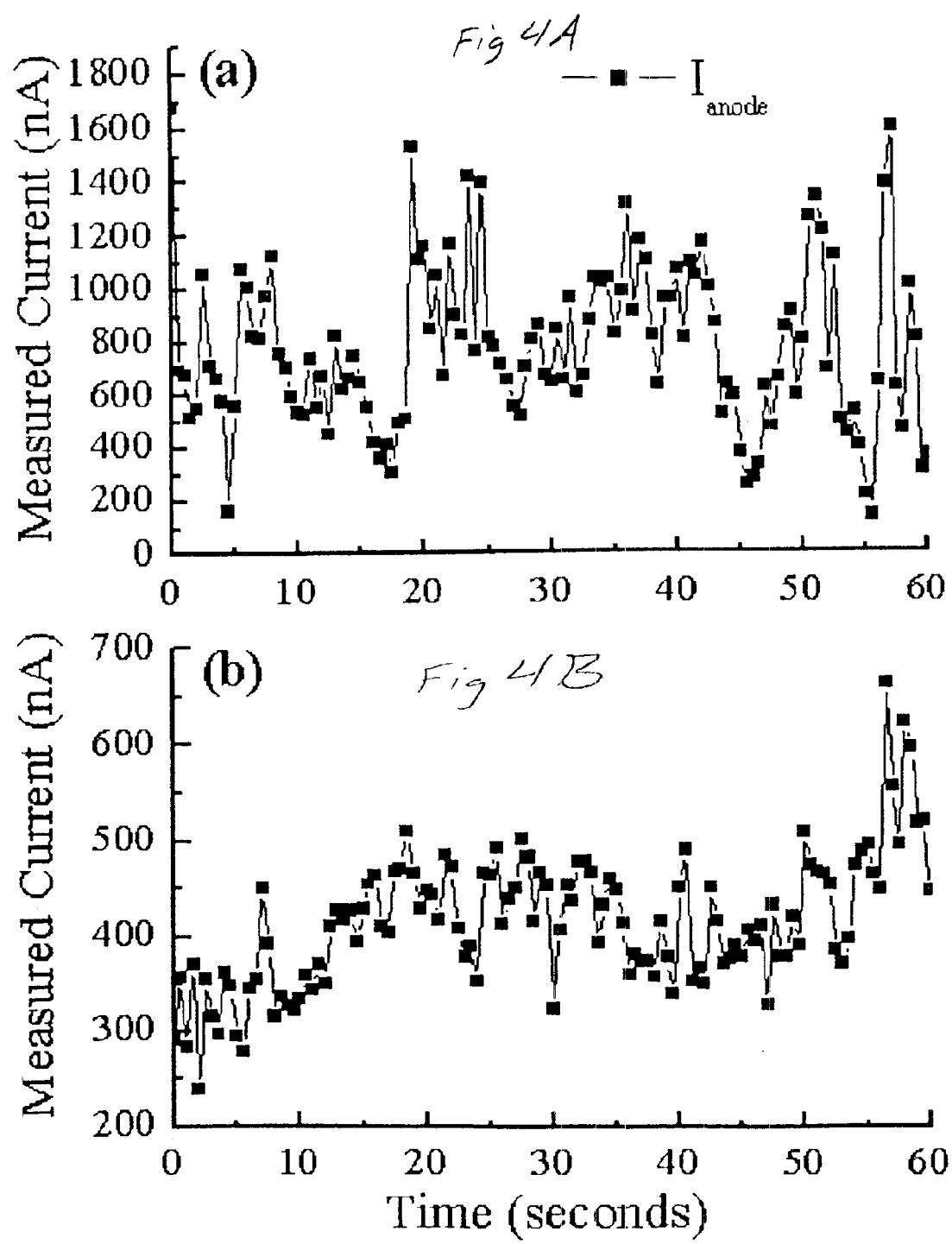
FIG. 4A illustrates current as a function of time (without ballast) for a device, representing an embodiment of the invention.
FIG. 4B illustrates current as a function of time (with ballast) for a device, representing an embodiment of the invention.

FIGS. 4A and 4B depict constant bias time plots of FE current from a 2-um aperture well structure with a cathode bias of 90V. The device was operated with and without a ballast resistance of 22 MΩ in series between the cathode and SMU3. Sixty second time slices are shown in FIG. 4B (with ballast) and FIG. 4A (without ballast). These tests were conducted continuously for 10 minutes each. In both of these tests the average gate current remained below 3 nA, while the anode current averaged above 400 nA with the ballast resistor and 700 nA without. This shows that less than 1% of the emitted current is collected by the gate during device operation. This is an important advantage of the invention and is in stark contrast to the device presented by Wang where more than 30% of the total anode current is seen at the gate. [10] This data also indicates that the emitted current from the VACNF cathode is coming from a well-focused point source, the fiber tip. Also, it is interesting to note that the single VACNF emitter is capable of achieving similar operating currents compared to the devices employing disordered mats of CNT material.

FIG. 4C depicts a FE I-V curve taken with the ballast resistor still in place. This data was taken after the 20 minutes of constant bias testing and indicates both a reduction in $E_{to}$ to approximately 60 V/μm (a drop of 25% from the initial value) and a more monotonic increase in Fe current with increasing gate-cathode bias. While not being bound by theory, these two observations may be attributed to emitter conditioning during FE operation.

Example 2

A schematic diagram of a different device fabrication process for the gated cathode structures is shown in FIGS. 7A–7I. Whole 3" or 4" low resistivity n-type Si wafers were used as substrates throughout this example. Conventional high-resolution electron beam lithography (EBL) and liftoff pattern transfer was used to define catalyst site(s) 710 for deterministic growth of VACNF and alignment marks for subsequent lithographic patterning processes (see FIG. 7A). The catalyst site pattern consisted of 100-nm diameter circles. These patterns were metallized with 100 Å of Ti followed by 100 Å of Ni deposited by electron beam physical vapor deposition (PVD). The Ti layer was deposited between the Ni catalyst and Si substrate to prevent catalyst silicide formation at the moderately high growth temperature of approximately 700° C. The wafers were mounted directly on a heated cathode inside the PECVD growth system. After evacuating the growth system to a suitable base pressure, the temperature of the cathode was increased and ammonia ($NH_3$) was introduced into the chamber and a dc glow discharge plasma was initiated. As a result of this treatment, catalyst nanoparticles were formed from the deposited circular catalyst pattern. For Ni patterns with the diameter and thickness used here, only a single nanoparticle was formed at each patterned site. These nanoparticles act as the necessary seeds for the catalytic growth of isolated VACNFs. After the pre-etching step, acetylene ($C_2H_2$) was introduced into the chamber during continued operation of the $NH_3$ plasma and VACNF growth of a substantially vertically aligned carbon nanostructure 720 was initiated (see FIG. 7B). The $NH_3$ and $C_2H_2$ gas flows used in this example were 80 sccm and 60 sccm, respectively. The total gas pressure during the growth was ~2.5 torr. Post-growth imaging of VACNFs was carried out using a Hitachi S4700 high-resolution scanning electron microscope (SEM) equipped with an x-ray energy dispersive spectroscopy (EDS) detector.

Figures 7A, 7B, 7C, 7D, 7E, 7F, 7G, 7H, 7I:
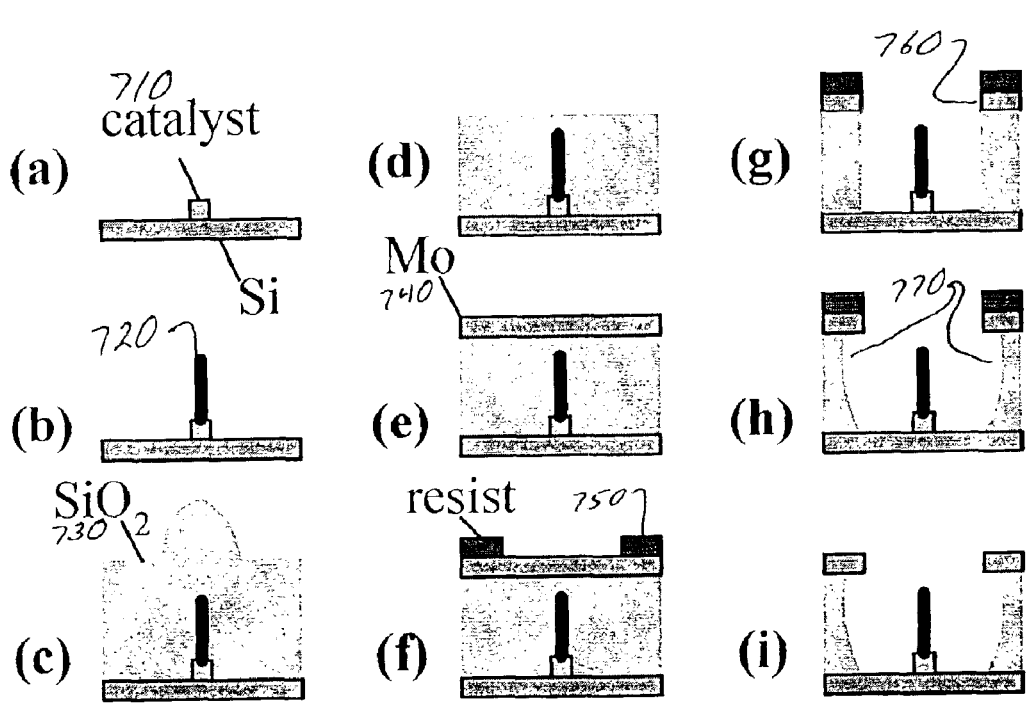
FIGS. 7A–7I illustrate an overview of the gated cathode fabrication process: (a) EBL is used to define catalyst sites for VACNF growth; following metallization VACNF are produced using dc PECVD (b); the substrates are then coated with a layer of $SiO_2$ (c) and planarized using CMP (d); the gate electrode is deposited (e) followed by the lithographic patterning of the gate aperture aligned to the buried VACNF emitter (f); using the resist as an etch mask RIE is used to transfer the aperture pattern into the electrode and remove the $SiO_2$ from the fiber (g); a brief wet etch is used to introduce undercut into the sidewalls of the $SiO_2$ layer (h); and finally, the remaining resist is removed completing the structure (i), representing an embodiment of the invention.
Figure 8:
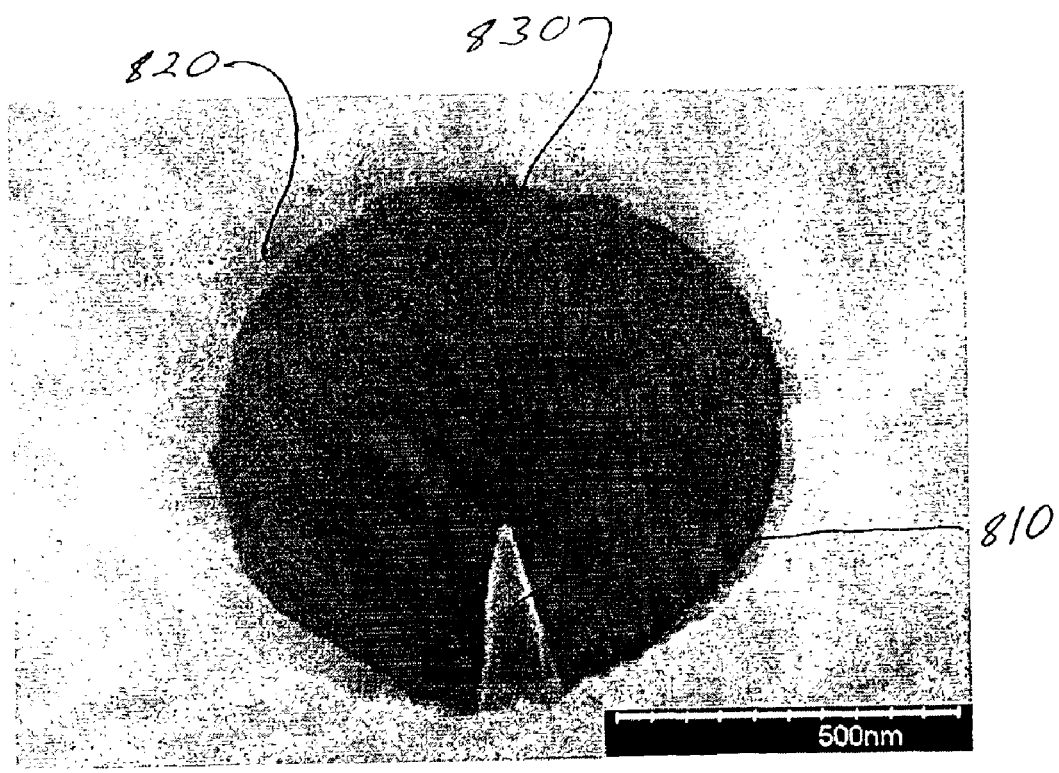
FIG. 8 illustrates an SEM micrograph of a completed gated cathode structure taken at 30 degrees from normal incidence; the gate aperture shown is 800 nm in diameter; the VACNF emitter has a 20 nm radius of curvature and is approximately 800 nm tall, representing an embodiment of the invention.

Following characterization of the VACNF material, a 2.5-μm thick conformal layer of $SiO_2$ 730 was deposited onto the substrates using a silane-based RF PECVD process (see FIG. 7C). In order to perform further processing on these substrates, chemical mechanical polishing (CMP) was used to planarize the structures (see FIG. 7D). The $SiO_2$ layer was polished until all gross surface nonuniformities were removed, producing a final oxide thickness of approximately 1.5 µm. A 50-nm thick layer 740 of Mo was then deposited onto the substrates using electron beam PVD (FIG. 7E). Photoresist 750 was applied to the substrates and the gate electrode pattern was exposed (FIG. 7F). This pattern consisted of macroscopic bonding pads connected to 10-µm square electrodes with 2-µm diameter apertures 760 aligned to the VACNF buried beneath the $SiO_2$ layer. Using the resist as an etch mask, the substrates were subjected to a $CF_4/O_2$ reactive ion etch (RIE) to pattern the Mo gate layer 740 followed by a $CHF_3/O_2$ $SiO_2$ etch (see FIG. 7G) to release the buried VACNF 720. The structures were dipped into a dilute HF solution for 1 minute to create undercut 770 in the well sidewall profile (see FIG. 7H) to help prevent charging of the well sidewalls during device operation. Finally, the photoresist was removed in acetone (see FIG. 7I), completing the structure. A SEM micrograph of a finished device taken at a 30° angle from normal incidence is shown in FIG. 8. A conical nanostructure 810 is substantially coaxially located with respect to an aperture 820 and a well 830.

Example 3

Figures 9A, 9B, 9C, 9D, 9E, 9F:
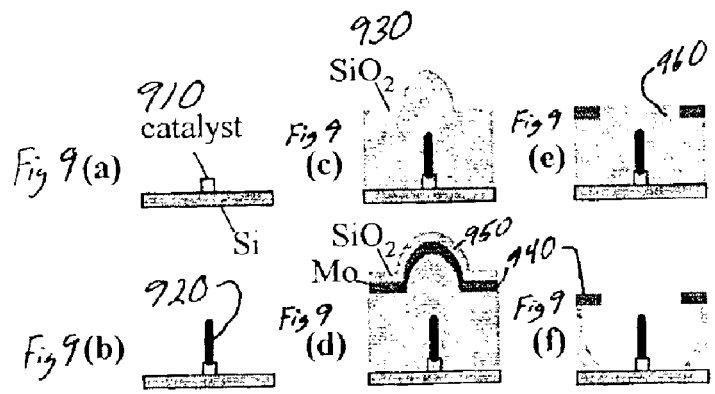
FIGS. 9A–9F illustrate a summary of a VACNF-based self-aligned gated cathode fabrication process, representing an embodiment of the invention.

A schematic diagram of a self aligned fabrication process for the gated cathode structures is shown in FIGS. 9A–9F. In this example, whole 3" low resistivity Si n-type wafers were used as substrates. Electron beam lithography and physical vapor deposition (PVD) were used to realize the catalyst site(s) 910 for VACNF growth and alignment marks for subsequent lithographic patterning (see FIG. 9A). DC plasma enhanced chemical vapor deposition (PECVD) of VACNF material 920 was performed at 700° C. (see FIG. 9B). This process produced VACNF that were 1-µm tall on average with tip diameters of less than 30 nm. A 1.2 µm thick layer of $SiO_2$ 930 was deposited onto the substrates using a silane-based rf PECVD process and resulted in the formation of conformal mounds surrounding the VACNF emitters (see FIG. 9C). The gate electrode 940 was defined using photolithography, omitting any lithographic definition of apertures aligned to the VACNF emitters. The gate pattern was metallized with 50 Å of Cr followed by 2000 Å of Mo deposited by electron gun PVD. The chrome can function as an adhesion promoting layer. Pattern transfer was performed by a lift-off technique. Alternatively, the layer which is patterned to define electrode 940 can be fabricated by all additive or subtractive techniques, such as, for example, deposition followed by applicative of resist, followed by etching and stripping. Before performing CMP, an additional layer 950 of $SiO_2$ was deposited onto the substrate to provide better control over the CMP process (see FIG. 9D). CMP was then performed to remove the mounds created during the PECVD $SiO_2$ deposition and resulted in the creation of self-aligned gate electrode apertures 960 (see FIG. 9E). A diluted solution of hydrofluoric acid (HF) was used to release the buried VACNF emitters (FIG. 9F). The structures were thoroughly rinsed in DI water and blown dry with $N_2$.

Scanning electron microscope (SEM) micrographs of completed devices are shown in FIGS. 10A–10F. The three images on the right side were taken at normal incidence to the substrate and show reasonably good concentric alignment between the gate aperture and the VACNF emitter. Three corresponding oblique angle images are shown on the left side and were taken at 45° from normal incidence. These images show the quality of the VACNF in the well 1010, 1020, 1030 demonstrating that the processing used to create these devices leaves the emitter free of gross macroscopic damage.

Figures 10A, 10B, 10C, 10D, 10E, 10F:
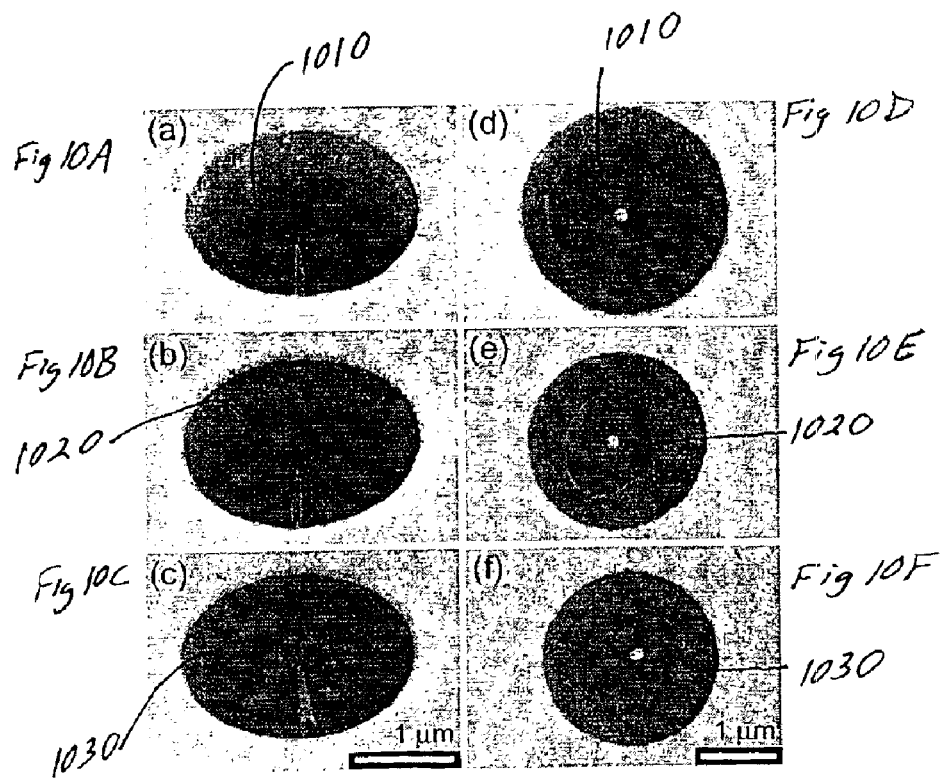
FIGS. 10A–10F illustrate SEM micrographs of devices following CMP and wet chemical etching processes; (a–c) oblique angle micrographs taken at 45° of the corresponding devices shown in (d–f) which were taken at normal incidence, representing an embodiment of the invention.

The position and shape of the gate electrode aperture of each device was found to be slightly different due to the variations in VACNF morphology including height, cone angle and degree of orthogonality with respect to the substrate. In FIGS. 10A and 10B, the VACNF are relatively straight and sharp with small cone angles. As a result, the aperture formed in these devices is round, fairly smooth and within 100 nm of concentric alignment with the VACNF emitter (refer to FIGS. 10D and 10E). The diameter of the aperture is a function of the amount of $SiO_2$ placed on the emitter and how conformal that material covers the VACNF. In this example, electrodes with diameters ranging from 2 to 2.4 µm were produced. This was attributed to the uniformity of the PECVD process used to deposit the $SiO_2$ layer coupled with the intrinsic variation of the VACNF emitter geometry. While PECVD processes used to deposit the dielectric layer can be adjusted to produce films with zero nonuniformity across an entire substrate, variations in the VACNF growth are not nearly as easy to control. This point is exemplified in FIG. 10. The VACNF shown in this image is slightly tilted resulting in the formation of an aperture that is greater than 100 nm misaligned with the emitter tip. While this aperture is round with smooth edges it is clear that the degree and direction of the misalignment is a direct result of the geometry of the VACNF (refer to FIG. 10F). While the alignment of the VACNF is understood to be a function of the interaction of the catalyst particle with the electric field present in the plasma sheath during the growth process, unexpected relatively small variations from the ideal model can clearly occur.

Figures 11A, 11B:
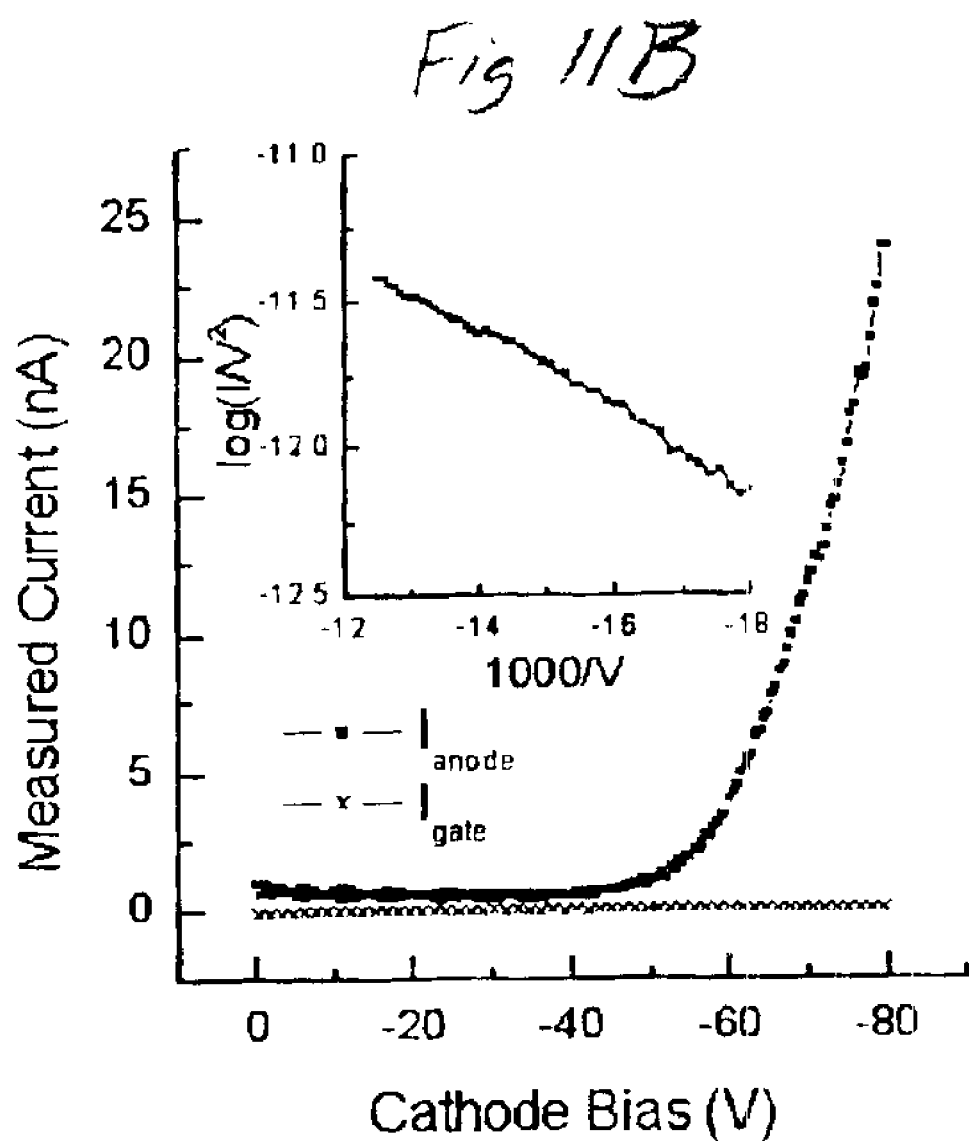
FIG. 11A illustrates an FE I-V curve of a single gated cathode device fabricated using the self aligned process following emitter conditioning for 1 hr, representing an embodiment of the invention.
FIG. 11B illustrates the measured anode current from FIG. 11A plotted in Fowler-Nordheim coordinates, representing an embodiment of the invention.

Referring to FIGS. 11A and 11B, field emission measurements were conducted in a vacuum chamber operated at a pressure of $10^{-7}$ torr. Data were collected by placing a flat Cu anode roughly 1 mm away from the surface of the VACNF field emission devices. A Keithley Instruments model 2410 dc source-measure units were connected to the cathode, gate and anode to provide simultaneous and independent control of the potentials at each node while recording the corresponding currents. The data presented in this work were obtained with the gate at ground potential, and a 100-V positive bias on the anode. Anode and gate currents were measured as the cathode potential was varied between ground and −100 V.

Devices were conditioned by sourcing 20 nA of current through the emitter for periods of 1 hr continuously. FE current vs. voltage (I-V) curves were taken following the initial conditioning period. An example curve is shown in FIG. 11A and displays a threshold voltage of 50 V, defined here as the gate-to-cathode bias required to source 1 nA of current to the anode. However, this value is a strong function of the aspect ratio of the VACNF. During all tests performed on these devices, the amount of current measured at the gate was negligible and never increased beyond the noise level of the measurement system, while the current measured at the anode varied less than 1% from the current sourced through the VACNF emitter. This implies that the emission site is localized to a point toward the center of the device, presumably the VACNF tip. The measured anode current plotted in Fowler-Nordheim coordinates is shown in FIG. 11B. The linear nature of this plot indicates that FE is occurring by a tunneling mechanism in the tested range of cathode bias in accordance with the Fowler-Nordheim model of FE.

Example 4

The process for VACNF-based gated cathode fabrication can be extended to produce multi-electrode structures. In this example, we have demonstrated this concept by fabricating an integrated triode source where the gate and anode are contained in a monolithic device structure.

A schematic flow diagram of a triode fabrication process used in this example is shown in FIGS. 12A–12J. Whole 3" or 4" low resistivity n-type Si wafers were used as substrates throughout this example. Conventional high-resolution electron beam lithography (EBL) and liftoff pattern transfer was used to define catalyst site(s) 1210 for deterministic growth of VACNF and alignment marks for subsequent lithographic patterning processes (see FIG. 12A). The catalyst site pattern consisted of 100-nm diameter circles. These patterns were metallized with 100 Å of Ti followed by 100 Å of Ni deposited by electron beam physical vapor deposition (PVD). The Ti layer was deposited between the Ni catalyst and Si substrate to prevent catalyst silicide formation at the moderately high growth temperature, approximately 700° C. The wafers were mounted directly on a heated cathode inside the PECVD growth system. After evacuating the growth system to a suitable base pressure, the temperature of the cathode was increased and ammonia ($NH_3$) was introduced into the chamber and a dc glow discharge plasma was initiated. As a result of this treatment, catalyst nanoparticles were formed from the deposited circular catalyst pattern. For Ni patterns with the diameter and thickness used in this example, only a single nanoparticle was formed at each patterned site. These nanoparticles act as the seeds for the catalytic growth of isolated VACNFs. After the pre-etching step, acetylene ($C_2H_2$) was introduced into the chamber during continued operation of the $NH_3$ plasma beginning the VACNF growth to form carbon nanostructure 1220 (see FIG. 12B). The $NH_3$ and $C_2H_2$ gas flows used in this example were 80 sccm and 60 sccm, respectively. The total gas pressure during the growth was ~2.5 torr. Post-growth imaging of VACNF was carried out using a Hitachi S4700 high-resolution scanning electron microscope (SEM) equipped with an x-ray energy dispersive spectroscopy (EDS) detector. VACNF produced for this work were found to have a radius of curvature of 30 nm and a height of 800 nm, on average.

Figures 12A, 12B, 12C, 12D, 12E, 12F, 12G, 12H, 12I, 12J:
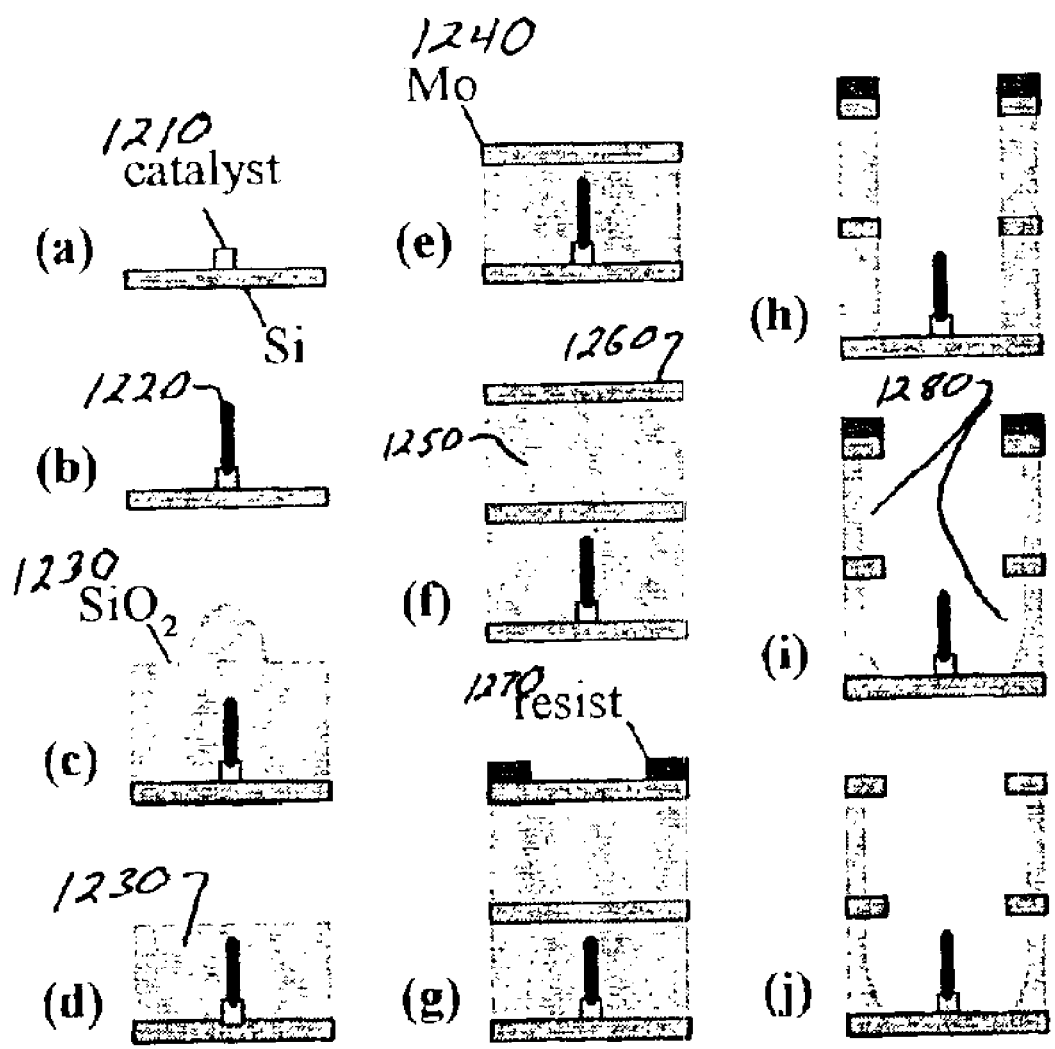
FIGS. 12A–12J illustrate an overview of the fabrication process for producing VACNF-based electron sources with an integrated focusing electrode; following the deposition of the gate electrode layer (e), a second layer of $SiO_2$ is deposited using rf PECVD and the anode electrode is patterned and metallized (f) in an analogous manner to the gate electrode; photoresist is spun onto the wafer the aperture pattern is exposed aligned to the buried VACNF emitter (g); using the resist as an etch mask, the aperture pattern is transferred into the substrate using RIE (h); a brief wet etch is used to introduce undercut into the sidewall profile (i) followed by removal of the remaining resist (j), representing an embodiment of the invention.
Figure 13:
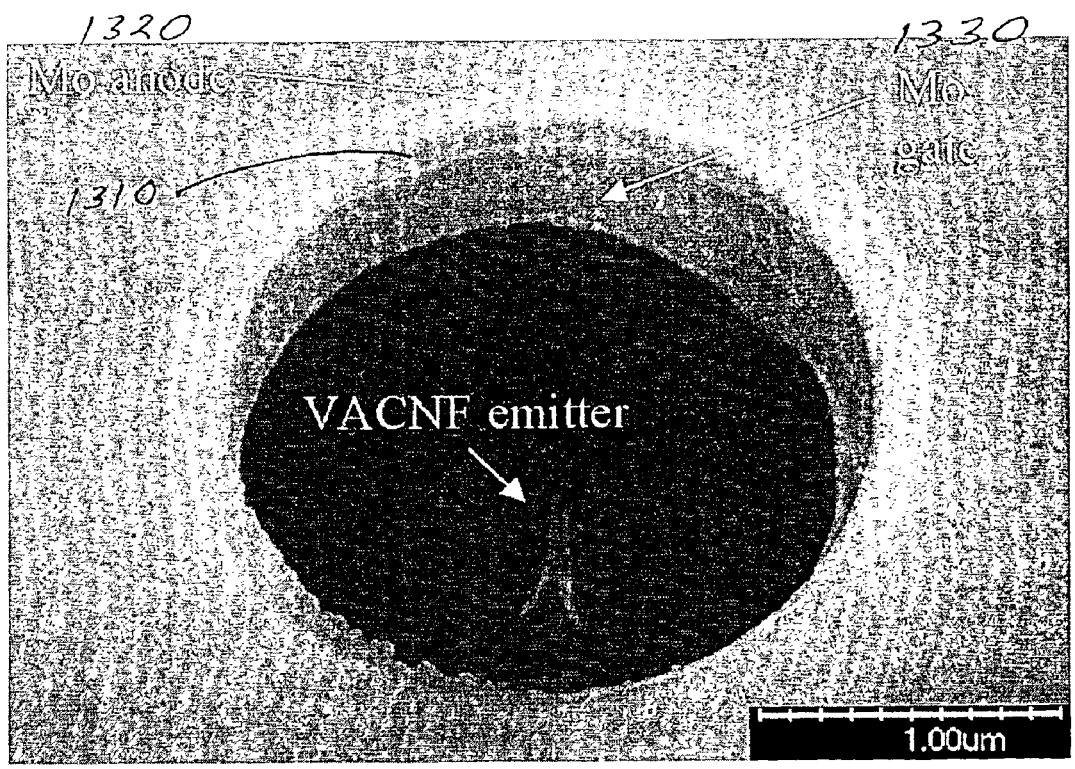
FIG. 13 illustrates an SEM micrograph of a completed VACNF-based source with an integrated focus electrode taken at 35° from normal incidence; the electrode apertures shown are 2 μm in diameter; the VACNF emitter has a 35 nm radius of curvature and is approximately 800 nm tall, representing an embodiment of the invention.

Following characterization of the VACNF material, a 2.5-$\mu$m thick conformal layer of $SiO_2$ 1230 was deposited onto the substrates using a silane-based rf PECVD process (see FIG. 12C). In order to perform further processing on these substrates, chemical mechanical polishing (CMP) was used to planarize the structures (see FIG. 12D). The $SiO_2$ layer was polished until all gross surface nonuniformities were removed, producing a final oxide thickness of approximately 1.5 $\mu$m. A 50-nm thick layer of Mo 1240 was then deposited onto the substrates using electron beam PVD (see FIG. 12E). Photoresist was applied to the substrates and the gate electrode pattern was exposed omitting the extractor aperture. (see FIG. 12F). A second layer of $SiO_2$ 1250 was deposited onto the substrates to serve as an insulating layer between the gate and focus electrodes. The thickness of this layer ranged from 500 nm to 1-$\mu$m for different process runs. The focus electrode 1260 was then metallized and patterned using identical processing as the gate electrode (see FIG. 12G). Advantageously, a charge dissipating layer (similar to element 150 in FIG. 1(f)) can be coupled to focus electrode 1260. Photoresist 1270 was applied to the substrate and photolithography was used to define the electrode apertures aligned to the buried VACNF emitter (see FIG. 12H). Using the resist as a mask, the aperture was etched into the focus electrode 1260 layer using a $CF_4/SF_6$ reactive ion etch (RIE). This etch was followed by removal of the upper oxide layer 1250 by a $CHF_3/O_2$ RIE. After removing this layer, the RIE of the Mo layer 1240 was repeated to pattern the gate electrode aperture. The processes concluded with the RIE of the lower $SiO_2$ layer 1230, a brief buffered HF etch to introduce an undercut 1280 into the sidewalls (see FIG. 12I) and removal of the remaining photoresist (see FIG. 12J). It can be appreciated that the exposure that forms the aperture in the focusing electrode can also be used to form the aperture in the gate electrode. A SEM micrograph of a finished device with a 500-nm thick layer 1310 of $SiO_2$ deposited between the focus 1320 and gate 1330 electrodes is shown in FIG. 13 taken at a 35° angle from normal incidence.

Field emission measurements were carried out in a chamber evacuated to a base pressure of $10^{-6}$ torr to simulate operation in less than ideal environments similar to those expected during envisioned applications. A flat Cu anode was placed 1 mm directly above the Si substrate containing the VACNF-based gated cathode FE devices. Keithley Instruments (KI) model 2410 dc source-measure units (SMU) were used to perform all measurements. For each device under test, a separate SMU was connected to the cathode, gate, focusing electrode and Cu anode.

Referring to FIGS. 14, 15, 16A and 16B, during device testing, the gate electrode was held at 0 V and a 1-kV positive bias was placed on the macroscopic Cu anode. The anode, gate, focus electrode and substrate currents were then measured as the potential on the cathode and focus electrodes were varied independently from 0 V to $-100$ V and $-30$ V to 50 V, respectively. In this example, only individual devices were analyzed with a 1-$\mu$m thick layer of $SiO_2$ deposited between the focus and gate electrodes; the operation of arrays of devices was not explored. Testing of FE devices in arrays can mask important details of individual device performance and therefore is not relevant for electron sources used in a lithography or microscopy context.

Figure 14:
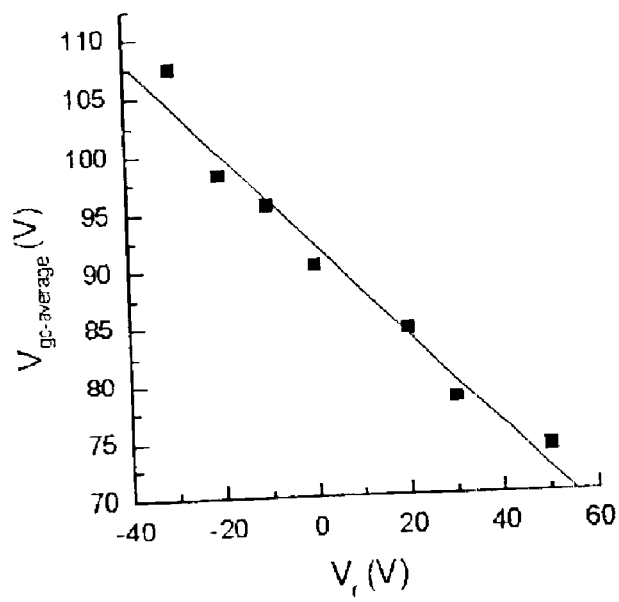
FIG. 14 illustrates $V_{gc}$ required to extract 20 nA of current from the VACNF cathode as a function of $V_f$; each value of $V_{gc}$ shown in this plot is the average value measured over 5 minutes, representing an embodiment of the invention.
Figure 15:
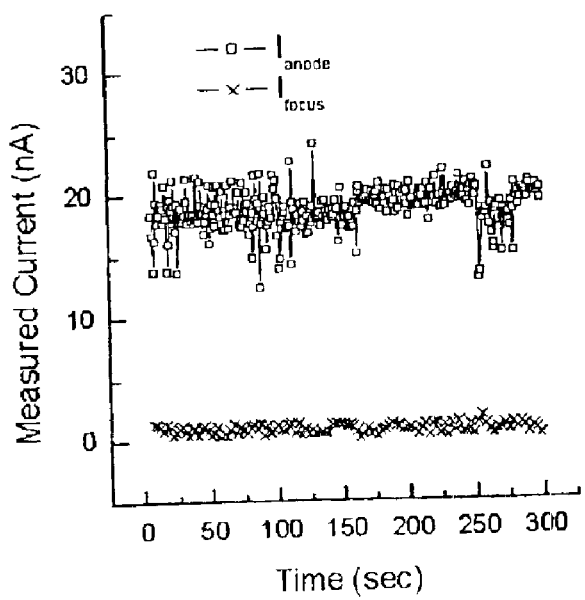
FIG. 15 illustrates $I_a$ and $I_f$ measured while maintaining a constant emission current of 20 nA and $V_f$=50 V; over 93% of the emitted current reached the anode with the remainder being collected by the focus and gate electrodes, representing an embodiment of the invention.

Devices were conditioned by using the KI 2410 connected to the cathode to vary the gate-to-cathode bias, $V_{gc}$, such that a 20 nA beam was emitted from the VACNF. During this process, the focus voltage, $V_f$, was set to 0 V. Once reproducible operation of the device was obtained the effect of varying $V_f$ was analyzed. This was accomplished by sourcing 20 nA through the VACNF emitter as described above and fixing $V_f$ at a given potential for 5 minutes. FIG. 14 shows that a distinct linear relationship exists between the average value of $V_{gc}$ required to source 20 nA of emission current through the VACNF emitter and the value of $V_f$. FIG. 15 shows the current measured at the focusing electrode, $I_f$, and anode, $I_a$ during one of these tests where $V_f$=50 V. Over 93% of the average emitted current reached the anode with the remainder being collected by the focus and gate electrodes. Following these tests, a FE I-V curve was obtained by sweeping the cathode voltage from 0 to $-75$ V while holding the gate voltage, $V_g$, at 0 V and $V_f$ at 50 V. A sample of the anode current measured during this test is shown in FIG. 16A and plotted in Fowler-Nordheim coordinates in FIG. 16B.

While lowering $V_f$ below $V_g$ has been shown to increase beam focusing, it reduces the field at the tip requiring a larger value of $V_{gc}$ to source the desired amount of current. The low percentage of current collected by the focus and gate electrodes implies that the emitted beam is reasonably well focused even though $V_f$ is significantly larger than $V_g$. The geometry of the device gives an angular limit of ~70° for the cone angle of the emitted beam under these operating conditions. Assuming a large degree of defocusing is caused by the given value of $V_f$, it should be possible to generate a highly focused beam by finding the optimum level of bias for this electrode.

Figure 17:
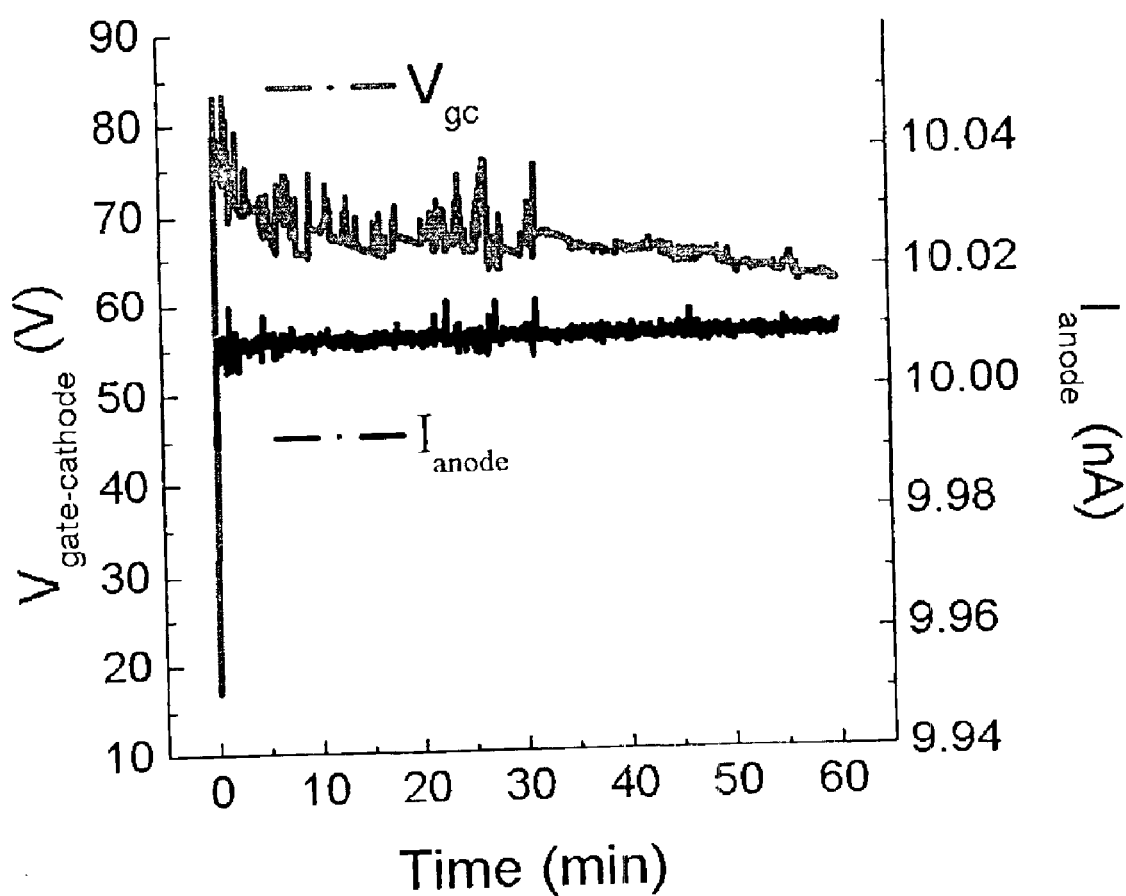
FIG. 17 illustrates constant current bias measurement of a single VACNF gated cathode over the period of 1 hour; the voltage bias applied between the gate and substrate required to source 10 nA of current decreases in magnitude over time; the voltage and current noise also decreases as a function of time, representing an embodiment of the invention.

Referring to FIGS. 17, 18, 19A and 19B, during gated cathode testing the gate electrode was held at 0 V and a 100-V positive bias was placed on the macroscopic Cu anode. The anode, gate and substrate currents were then measured as the cathode potential was varied between ground and −100 V. Gated cathode devices were operated in a constant current sourcing mode. FIG. 17 shows the gate to cathode bias, $V_{gc}$, required to generate 10 nA of current from the VACNF emitter for a period of 1 hr. Also shown in FIG. 17 is the current measured at the Cu anode during this test. It is clear from this data that the amount of bias required to achieve this level of operating current decreased over time. This is presumably due to removal of surface contaminants on the VACNF surface as a result of the processing used to fabricate the device structure. The voltage noise, and, subsequently the emitted current noise, also decreased with time. This may also be attributed to the surface of the VACNF becoming more stable after prolonged periods of test. It is also important to note that substantially all of the current sourced by the cathode is collected by the anode while only a moderate bias is applied at this node. This suggests that the emitted beam emerges from a point toward the center of the device structure, presumably the VACNF tip. Typically less than 1% of the total emitted current is measured at the gate electrode during periods of testing as long as 12 hours. The slight increase in current measured at the anode versus the sourced cathode current can be attributed to secondary electron generation in the Cu plate.

Figures 18A, 18B:
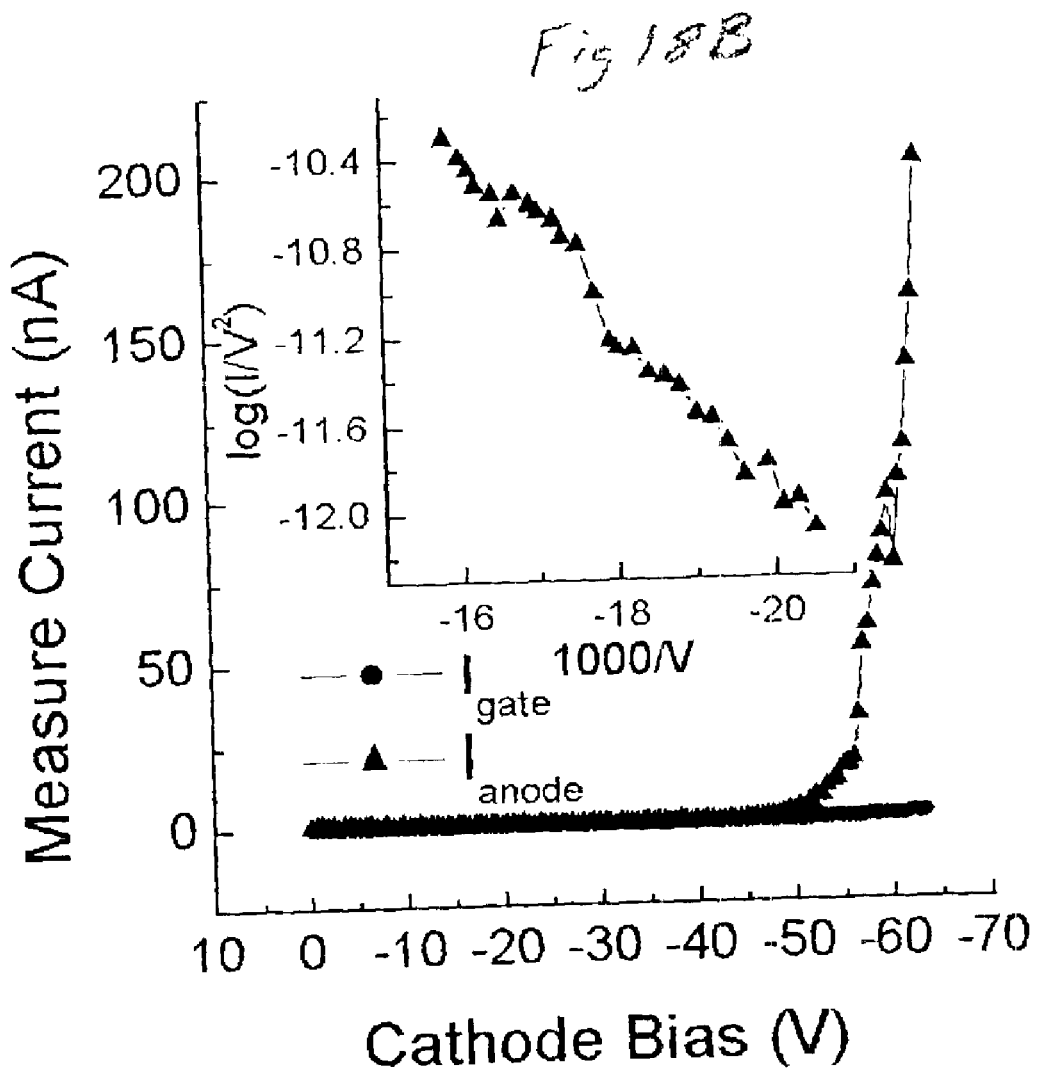
FIGS. 18A and 18B illustrate (a) an FE I-V curve from a VACNF gated cathode structure with a 1.2-um diameter aperture; the gate current is typically less than 1% of the total current delivered to the anode electrode biased at 100 V and placed 1 mm above the substrate surface; this implies that the emitted beam is emerging from a point source toward the center of the cathode, presumably the fiber tip; and (b) the anode current of (a) plotted in Fowler-Nordheim coordinates, representing an embodiment of the invention.
Figure 19:
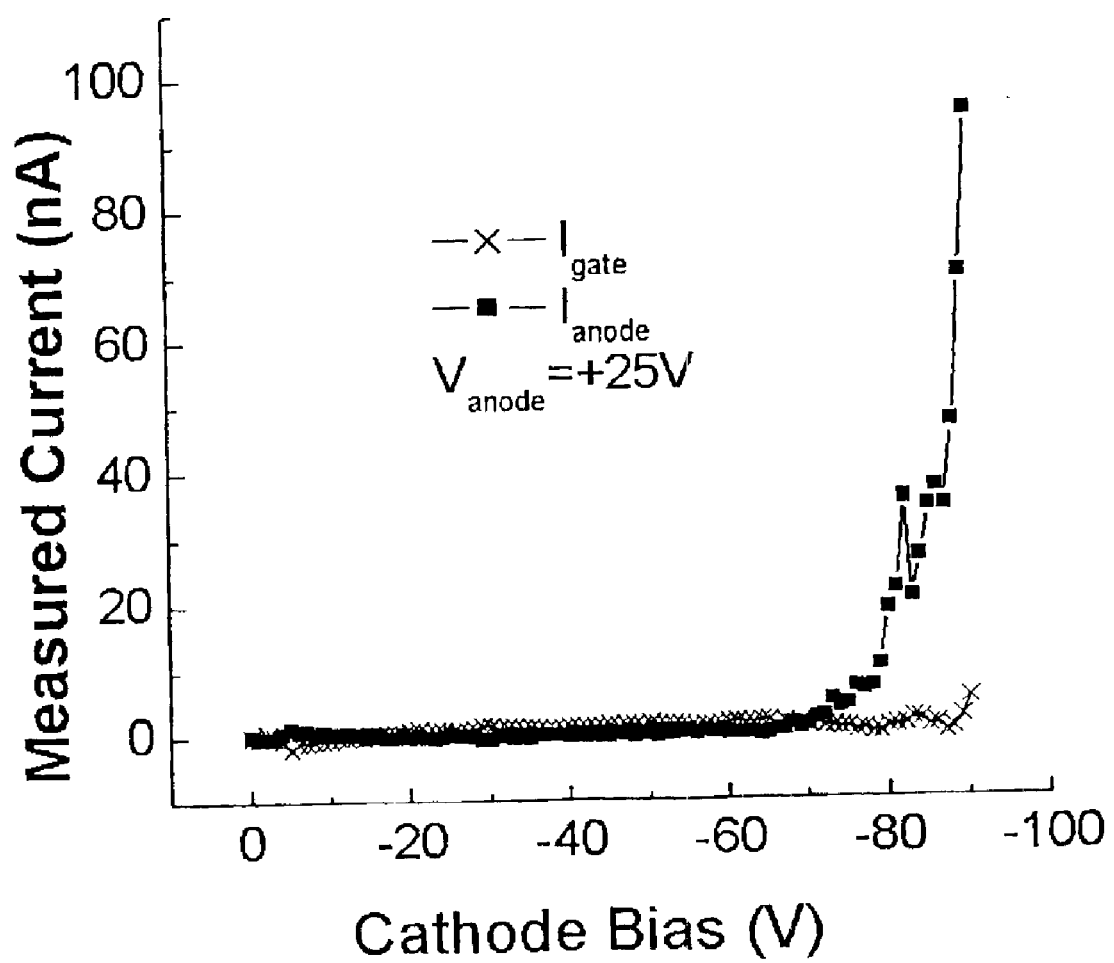
FIG. 19 illustrates an FE I-V curve of a VACNF-based electron source with an integrated focusing electrode; the curve was obtained from a device structure with 2 μm aperture electrodes and 25 V bias applied to the focusing electrode and the external macroscopic anode at 0V, representing an embodiment of the invention.

A typical FE I-V curve for an individual 1.2-um aperture device is shown in FIG. 18A following constant current operation at 10 nA for 1 hr. This curve shows a value of $V_{th}$ of 50 V. A fairly linear fit is obtained by plotting the latter portion of this curve in Fowler-Nordheim coordinates (see FIG. 18B) indicating that the emission mechanism is due to a tunneling process. Once again, less than 1% of the total emitted current is seen at the gate electrode during the test. Post emission characterization of the VACNF tip was conducted using SEM and revealed no significant morphological changes to the device structure provided that the device is operated at moderate levels of emission current (less than 200 nA). Operation of these devices at higher levels of emission current typically resulted in damage to the electrostatic gating structure or, for currents exceeding 5 uA, destruction of the VACNF emitter. The nature of this damage is unclear at this time but presumably due to arcing between the emitter tip and the gate electrode.

Testing of the VACNF-based integrated triode sources was performed in a similar manner to the gated cathode devices. The primary difference was the replacement of the external macroscopic Cu anode with the integrated anode electrode. A potential of 25 V was placed on this node during all device testing. Following emitter conditioning for 10 min. by constant current sourcing, as described above, FE I-V curves were obtained. An example of this data is shown in FIG. 7 for a 2-μm aperture device with a 500-nm gate-to-anode spacing. Less than 3% of the total emitted current was observed at the gate electrode, with roughly 80% being collected by the integrated anode. The threshold voltage for these devices also agrees well with results observed for similar geometry gated cathode devices. The observed current noise can be attributed to the shorter conditioning time of the emitter. Longer conditioning times resulted in damage to the anode electrode that resulted in device failure. The cause of this damage is believed to be the quality of the PECVD $SiO_2$ used as the interelectrode dielectric.

Practical Applications of the Invention

A practical application of the invention that has value within the technological arts is fabrication of vacuum micro/nano-electric devices including: high frequency, high temperature, and radiation tolerant electronics; field emission electron guns for flat panel displays; field emission electron guns for massively parallel lithography; field emission electron guns for electron microscopy, field emission electron guns for conventional electron lighography. There are virtually innumerable uses for the invention, all of which need not be detailed here.

Advantages of the Invention

Methods of fabricating field emission devices and field emission devices made by those methods provide significant advantages for at least the following reasons. The invention can provide deterministic control of location, orientation, shape and density of an emission site in the context of a deterministically located, orientated and shaped gate. The invention prevents charging of the electrode structure(s) during device fabrication processing, thereby increasing yield. The invention results in minimal structural damage to the emitter material during fabrication processing and may improve the field emission (FE) properties of the emitter during operation. The invention can help prevent charging of the well sidewalls during device operation. The invention can provide an environmentally stable electron emitter. The invention can provide source current for extended periods of time without causing degradation to the VACNF tip. The invention is capable of producing a device that can perform in less than ideal operating environments. The invention can produce an emitting device that exhibits very little (<1%) collection of emitted current by the gate structure. The invention can produce a well focused point source. The invention can provide a collimated emission source. The invention can produce a single emitter (e.g., VACNF) that is capable of achieving operating currents that are similar to those achieved by multiple emitters. The invention can produce an emitter that can be conditioned by operation to exhibit a reduction in $E_{to}$ from an initial value. The invention can produce an emitter that can be conditioned by operation to exhibit a monotonic increase in FE current with increasing gate-cathode bias. The invention can obviate the need during fabrication of the device for lithography equipment with sophisticated alignment capabilities which will reduce the cost of fabricating these devices.

All the disclosed embodiments of the invention disclosed herein can be made and used without undue experimentation in light of the disclosure. The invention is not limited by theoretical statements recited herein. Although the best mode of carrying out the invention contemplated by the inventors is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually all configurations. Further, the individual components need not be fabricated from the disclosed materials, but could be fabricated from virtually any suitable materials. Further, homologous replacements may be substituted for the substances described herein. Further, agents which are chemically related may be substituted for the agents described herein where the same or similar results would be achieved. Further, variation may be made in the steps or in the sequence of steps composing methods described herein. Further, although the emitter device described herein can be a separate module, it will be manifest that the emitter device may be integrated into the system with which it is (they are) associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

1 J. M. Bonard, J. P. Salvetat, T. Stochli, W. A. de Heer, L. Forro, and A. Chatelain, Appl. Phys Lett. 73,918 (1998).
2 Y. Saito, K. Jamaguchi, T. Nishino, K. Hata, K. Tohji, A. Kasuya, and Y. Nishina, Jpn. J. Appl. Phys., Part 2 36, L1340 (1997).
3 K. Matsumoto, S. Kinosita, Y. Gotoh, T. Uchiyama, S. Manalis, C. Quate, Appl. Phys. Lett. 78,539 (2001).
4 A. G. Rinzier, J. H. Hafner, P. Nokolaev, L. Lou, S. G. Kim, D. Tomaneck, P. Nodlander, D. T. Colbert, and R. E. Smalley, Science 269, 1550 (1995).
5 X. Xu and G. R. Brandes, Appl. Phys. Lett. 74, 2549 (1999).
6 V. I. Merkulov, D. H. Lowndes, L. R. Baylor, J. Appl. Phys, 89, 1933 (2001).
7 L. R. Baylor, V. I. Merkulov, E. D. Ellis, M. A. Guillorn, D. H. Lowndes, A. V. Melechko, M. L. Simpson, and J. H. Whealton, *J. Appl. Phys.,* 91, 4602 (2002).
8 K. A. Dean and B. R. Chalmala, Appl. Phys. Lett. 75, 3017 (1999).
9 X. Xu and G. R. Brandes, in *Materials Issures in Vacuum Microelectronics*/1998, W. Zhu, L. S. Pan, T. E. Felter, C. Holland, Editors, PV 509, p.107, Materials Research Society Proceedings Series, Warrendale, Pa. (1998).
10 Q. H. Wang, M. Yan and R. P. H. Chang, Appl. Phys. Lett. 78, 1294 (2001).
11 Y. H. Lee, Y. T. Jang, D. H. Kim, J. H. Ahn, and B. K. Ju, Advanced Mat. 13,479 (2001).
12 M. A. Guillorn, M. L. Simpson, V. I. Merkulov, L. R. Baylor, and D. H. Lowndes, J. Vac. Sci. Technol. B 19, 573 (2001).
13 M. A. Guillorn, E. D. Ellis, M. L. Simpson, A. V. Melechko, V. I. Merkulov, G. J. Bordonaro, L. R. Baylor Proceedings of the 45th International Conference on Electron, Ion and Photon Beam Technology and Nano-fabrication.
14 V. I. Merkulov, D. H. Lowndes, Y. Y. Wei, G. Eres and E. Voekl, Appl. Phys. Lett., 76, 3555 (2000).
15 W. A. de Heer, A. Chatelain, and D. Ugaarte, *Science,* 269, 1179 (1995).
16 K. B. K. Teo, M. Chhowalla, G. A. J. Amaratunga, W. I. Milne, G. Pirio, P. Legagneux, F. Wyczisk, D. Pribat, and D. G. Hasko, *Appl. Phys. Lett.,* 80, 2011 (2002).
17 F. S. Baker, A. R. Osborn and J. Williams, J. Phys. D: Appl. Phys., 7, (1974).
18 K. A. Dean, P. von Allmen, and B. R. Chalamala, J. Vac. Sci. Technol. B, 17, 1959 (1999).
19 K. A. Dean, and B. R. Chalamala, Appl. Phys. Lett., 76, 375 (2000).
20 K. A. Dean, T. P. Burgin, and B. R. Chalamala, Appl. Phys. Lett., 79, 1873 (2001).
21 T. Kuzumaki, Y. Takamura, H. Ichinose, and Y. Horiike, Appi. Phys. Lett., 78, 3699 (2001).
22 G. Pirio, P Legagneux, D. Pribat, K. B. K. Teo, M. Chhowalla, G. A. J. Amaratunga and W. I. Milne, Nanotechnology, 13, 1 (2001).
23 M. A. Guillorn, A. V. Melechko, V. I. Merkulov, E. D. Ellis, C. L. Britton, M. L. Simpson, D. H. Lowndes and L. R. Baylor, Appl. Phys. Lett., 79, 3506 (2001).
24 M. A. Guillorn, E. D. Ellis, M. L. Simpson, A. V. Melechko, V. I. Merkulov, G. J. Bordonaro, L. R. Baylor, and D. H. Lowndes, J. Vac. Sci. Tehnol. B., 19, 2598 (2001).
25 D. S. Hsu and J. Shaw, Appl. Phys Lett., 80, 118 (2002).
26 C. L. Tsai, C. F. Chen and C. L. Lin, Appl. Phys. Lett., 80, 1821 (2002).
27 J. I. Sohn and S. Lee, Appl. Phys. A, 74, 287 (2002).
28 V. I. Merkulov, A. V. Melechko, M. A. Guillorn, D. H. Lowndes, and M. L. Simpson, Appl. Phys. Lett., 79, 2970 (2001).
29 V. I. Merkulov, M. A. Guillorn, D. H. Lowndes, M. L. Simpson, and E. Voelkl, Appl. Phys. Lett., 79, 1178 (2001).
30 V. I. Merkulov, A. V. Melechko, M. A. Guillorn, D. H. Lowndes, and M. L. Simpson, Appl. Phys. Lett., 80, 476 (2001).
31 V. I. Merkulov, A. V. Melechko, M. A. Guillorn, D. H. Lowndes, and M. L. Simpson, Chem. Phys. Lett., 350, 381 (2001).
32 Z. F. Ren, Z. P. Huang, J. W. Xu, J. H. Wang, P. S. Bush, M. P. Siegal, and P. N. Provencio, Science, 282, 1105 (1998).
33 M. Chhowala, K. B. K. Teo, C. Ducati, N. L. Rupesinghe, G. A. J. Amaratunga, A. C. Ferrari, D. Roy, J. Robertson, and W. I. Milne, J. Appl. Phys. 90, 5308 (2001).
34 R. T. K. Baker, Carbon, 27, 315 (1989).
35 H. Busta, D. Furst. A. T. Rakhimov, V. A. Samorodov, B. V. Seleznez, N. V. Suetin, A. Silzars, Appl. Phys. Lett. 78, 3418 (2001).
36 M. A. Guillorn, T. E. McKnight, A. Melechko, V. I. Merkulov, P. F. Britt, D. W. Austin, D. H. Lowndes, and M. L. Simpson, J. Appl. Phys., 91, 3824 (2002).
37 J. H. Lee, Y. H. Song, S. Y. Kang, S. G. Kim, and K. I. Cho, J. Vac. Sci. Technol. B, 16, 811 (1998).
38 M. Ding, H. Kim and A. I. Akinwande, IEEE Electron Dev. Lett. , 21, 66 (2000).
39 D. Temple, Mater. Sci. Eng., R. 24, 185~1999!.
40 W. B. Herrmannsfeldt, R. Becker, I. Brodie, A. Rosengreen, C. A. Spindt, Nucl. Instrum. Methods A 298, 39 (1990)
41 R. M. Mobley and J. E. Boers, IEEE Trans. Electron Devices ED-38, 2383 (1991)
42 J. Itoh, Y. Tohma, K. Morikawa, S. Kanemaru and K. Shimizu J. Vac. Sci and Technol. B. 13, 1968 (1995)
42 Y. Toma, S. Kanemaru and J. Itoh J. Vac. Sci and Technol. B. 14, 1902 (1996)
43 A. Hosono, S. Kawabuchi, S. Horibata, S. Okuda, H. Harada and M. Takai, J. Vac. Sci. Technol. B, 17, 575 (1999)
44 A. A. G. Driskill-Smith, D. G. Hasko, H. Ahmed, Appl. Phys. Lett. 75, 2845 (1999)
45 C. Py, M. Gao, S. R. Das, P. Grant, P. Marshall and L. LeBrun, J. Vac. Sci. Technol. B, 18, 626 (2000)

47 D. Li and K. Zhang, J. Vac. Sci and Technol. B, 19, 1820 (2001)
48 L. Dvorson and A. I. Akinwande, J. Vac. Sci and Technol. B, 20, 53(2002)
49 D. Nicolescu, V. Filip, J. Itoh, J. Vac. Sci. Tehnol. B. 19, 892 (2001).

What is claimed is:

1. A method, comprising:
   growing a single substantially vertically aligned carbon nanostructure, the single substantially vertically aligned carbon nanostructure coupled to a substrate;
   covering at least a portion of the single substantially vertically aligned carbon nanostructure with a dielectric;
   forming a gate, the gate coupled to the dielectric;
   releasing the single substantially vertically aligned carbon nanostructure by forming an aperture in the gate and removing a portion of the dielectric; and
   forming a dielectric protection layer, the dielectric protection layer coupled to the gate, before releasing the single substantially vertically aligned carbon nanostructure,
   wherein removing a portion of the dielectric includes reactive ion etching.

2. A method, comprising:
   growing a single substantially vertically aligned carbon nanostructure, the single substantially vertically aligned carbon nanostructure coupled to a substrate;
   covering at least a portion of the single substantially vertically aligned carbon nanostructure with a dielectric;
   forming a gate, the gate coupled to the dielectric;
   releasing the single substantially vertically aligned carbon nanostructure by forming an aperture in the gate and removing a portion of the dielectric;
   coupling another dielectric to the gate before uncovering the single substantially vertically aligned carbon nanostructure; and
   coupling a focusing electrode to the another dielectric before releasing the single substantially vertically aligned carbon nanostructure.

3. The method of claim 1, wherein growing the single substantially vertically aligned carbon nanostructure includes growing a vertically aligned carbon nanofiber.

4. The method of claim 1, further comprising
   coupling another dielectric to the gate before uncovering the single substantially vertically aligned carbon nanostructure; and
   coupling a focusing electrode to the another dielectric before releasing the single substantially vertically aligned carbon nanostructure.

5. The method of claim 2, further comprising, before releasing the single substantially vertically aligned carbon nanostructure, forming a dielectric protection layer coupled to the gate, wherein removing a portion of the dielectric includes reactive ion etching.

6. The method of claim 1, wherein the dielectric protection layer includes a charge dissipating layer.

7. The method of claim 5, wherein the dielectric protection layer includes a charge dissipating layer.

8. The method of claim 1, further comprising lithographically defining the aperture.

9. The method ot claim 2, further comprising lithograghically defining the aperture.

* * * * *

UNITED STATES PATENT AND TRADEMARK OFFICE
CERTIFICATE OF CORRECTION

PATENT NO. : 6,858,455 B2
DATED : February 22, 2005
INVENTOR(S) : Michael A. Guillorn et al.

It is certified that error appears in the above-identified patent and that said Letters Patent is hereby corrected as shown below:

Title page,
Item [12], United States Patent, change "Guillom et al. " to -- Guillorn et al. --.
Item [75], Inventors, change "Guillom" to -- Guillorn --

Signed and Sealed this

Nineteenth Day of July, 2005

JON W. DUDAS
*Director of the United States Patent and Trademark Office*